United States Patent
Yi

(10) Patent No.: US 10,856,290 B2
(45) Date of Patent: Dec. 1, 2020

(54) SUBFRAME CONFIGURATION METHOD AND APPARATUS

(71) Applicant: HUAWEI TECHNOLOGIES CO., LTD., Shenzhen (CN)

(72) Inventor: Xiongshu Yi, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 76 days.

(21) Appl. No.: 16/205,327

(22) Filed: Nov. 30, 2018

(65) Prior Publication Data

US 2019/0110291 A1    Apr. 11, 2019

Related U.S. Application Data

(63) Continuation of application No. PCT/CN2017/078448, filed on May 28, 2017.

(30) Foreign Application Priority Data

May 31, 2016 (CN) .......................... 2016 1 0379379

(51) Int. Cl.
    H04W 72/04      (2009.01)
    H04W 16/10      (2009.01)
    H04L 5/00       (2006.01)

(52) U.S. Cl.
    CPC ....... *H04W 72/0446* (2013.01); *H04L 5/0092* (2013.01); *H04W 16/10* (2013.01)

(58) Field of Classification Search
    CPC .. H04W 72/0446; H04W 16/10; H04L 5/0092
    See application file for complete search history.

(56) References Cited

U.S. PATENT DOCUMENTS

2009/0059835 A1   3/2009  Motegi et al.
2013/0272170 A1*  10/2013 Chatterjee ............. H04W 28/08
                                                      370/280

(Continued)

FOREIGN PATENT DOCUMENTS

CN    103200577 A    7/2013
CN    103378963 A    10/2013

(Continued)

OTHER PUBLICATIONS

NSN, Nokia, "On the remaining issues of necessary backhaul signalling for TDD eIMTA", 3GPP TSG-RAN WG1 Meeting #75 R1-135560, San Francisco, USA, Nov. 11-15, 2013, total 4 pages.

*Primary Examiner* — Jackie Zuniga Abad
(74) *Attorney, Agent, or Firm* — Kilpatrick Townsend & Stockton LLP

(57) ABSTRACT

Embodiments of the present application relate to the communications field, and provide a subframe configuration method and apparatus. The method includes: classifying, by a base station, user equipments UEs in a first cell into N user groups, and determining an uplink-downlink subframe configuration required by each user group; determining a primary uplink-downlink subframe configuration of the first cell according to the uplink-downlink subframe configuration of each user group; determining configuration indication information of each user group according to the primary uplink-downlink subframe configuration and the uplink-downlink subframe configuration required by each user group; and sending, to each user group in the N user groups, the primary uplink-downlink subframe configuration and configuration indication information including at least the configuration indication information of the user group. The embodiments of the present application are applied to a full duplex scenario of a base station.

22 Claims, 10 Drawing Sheets

(56) References Cited

U.S. PATENT DOCUMENTS

| | | | |
|---|---|---|---|
| 2015/0085805 A1 | 3/2015 | Li et al. | |
| 2015/0117294 A1 | 4/2015 | Li et al. | |
| 2015/0201338 A1 | 7/2015 | Gopal et al. | |
| 2015/0256359 A1 | 9/2015 | Wang et al. | |
| 2015/0341927 A1* | 11/2015 | Wei | H04W 72/14 370/280 |
| 2016/0248553 A1* | 8/2016 | Shimezawa | H04L 5/14 |
| 2016/0249337 A1* | 8/2016 | Liang | H04W 72/042 |

FOREIGN PATENT DOCUMENTS

| | | |
|---|---|---|
| CN | 103458420 A | 12/2013 |
| CN | 103974434 A | 8/2014 |
| CN | 104938016 A | 9/2015 |
| EP | 2566219 A1 | 3/2013 |
| WO | 2012064244 A1 | 5/2012 |
| WO | 2014082526 A1 | 6/2014 |
| WO | 2015196483 A1 | 12/2015 |

* cited by examiner

SUBFRAME CONFIGURATION METHOD AND APPARATUS

CROSS-REFERENCE TO RELATED APPLICATIONS

This application is a continuation of International Application No. PCT/CN2017/078448, filed on Mar. 28, 2017, which claims priority to Chinese Patent Application No. 201610379379.0, filed on May 31, 2016. The disclosures of the aforementioned applications are hereby incorporated herein by reference in their entireties.

TECHNICAL FIELD

Embodiments of the present application relate to the communications field, and in particular, to a subframe configuration method and apparatus.

BACKGROUND

A full duplex wireless communications technology is a new communications technology. This technology may be used to implement co-frequency co-time communication.

In the prior art, an eNB (evolved NodeB) notifies UE (user equipment) of an uplink-downlink subframe configuration by using signaling (for example, MIB signaling, SIB signaling, or RRC signaling) carried in a broadcast message. The UE obtains a full duplex mode of the base station according to the uplink-downlink subframe configuration sent by the base station, and communicates with the base station. In addition, for a cell, if an uplink-downlink configuration carried in an uplink-downlink subframe configuration of the cell is fixed, all user equipments in the cell need to communicate with the base station by using the uplink-downlink subframe configuration. In other words, for the UE, a time for transmitting information in an uplink subframe to the base station and a time for receiving information transmitted by the base station in a downlink subframe are definite, and it is impossible to independently set an uplink-downlink subframe configuration for each user equipment.

However, in an actual operation process of a network, a ratio of uplink traffic to downlink traffic in a cell always changes as network quality, a service type, or the like changes, and use of the fixed uplink-downlink subframe configuration by the user equipment during system running obviously cannot satisfy a requirement of the foregoing change.

SUMMARY

Embodiments of the present application provide a subframe configuration method and apparatus, so that each user equipment in a first cell has an independent uplink-downlink subframe configuration.

To achieve the foregoing objective, the following technical solutions are used in the embodiments of the present application:

According to a first aspect, an embodiment of the present application provides a subframe configuration method, including: classifying, by a base station, user equipments UEs in a first cell into N user groups (N is a positive integer greater than or equal to 2), where user equipments UEs in a same user group of the N user groups have a same uplink-downlink subframe configuration; determining, by the base station, a primary uplink-downlink subframe configuration of the first cell according to an uplink-downlink subframe configuration of each user group in the N user groups, where the primary uplink-downlink subframe configuration includes a flexible subframe, and a transmission direction of the flexible subframe is variable; determining, by the base station, configuration indication information of each user group according to the primary uplink-downlink subframe configuration and the uplink-downlink subframe configuration of each user group in the N user groups, where the configuration indication information is used to indicate a transmission direction of the flexible subframe in each user group; and sending, by the base station, the primary uplink-downlink subframe configuration and the configuration indication information to each user group.

In the subframe configuration method provided by this embodiment of the present application, the base station classifies the user equipments in the first cell into the N user groups; and because the user equipments in the same user group use the same uplink-downlink subframe configuration, the base station can configure the corresponding configuration indication information for each user group according to the uplink-downlink subframe configuration of each user group and primary uplink subframe configuration information. In this way, when the base station sends the primary uplink-downlink subframe configuration to each user group in the N user groups, the user equipments in the same user group can make, only by adjusting a direction of each flexible subframe in at least one flexible subframe in the primary uplink-downlink subframe configuration of the first cell by using the configuration indication information of the user group to which the user equipments belong, the adjusted primary uplink-downlink subframe configuration of the first cell consistent with the uplink-downlink subframe configuration required by the user equipments. In this way, the base station can communicate with each user equipment in the first cell according to the uplink-downlink subframe configuration required by the user equipment.

With reference to the first aspect, in a first possible implementation of the first aspect, the first cell includes a first user group; and configuration indication information of the first user group is specifically used to instruct user equipment in the first user group to keep the transmission direction of the flexible subframe, where a transmission direction of a first subframe in the first user group is the same as a transmission direction of a first flexible subframe included in the primary uplink-downlink subframe configuration, and the first subframe is a subframe that has a same subframe number as the first flexible subframe; or configuration indication information of the first user group is specifically used to instruct user equipment in the first user group to invert the transmission direction of the flexible subframe, where a transmission direction of a first subframe in the first user group is opposite to a transmission direction of a first flexible subframe included in the primary uplink-downlink subframe configuration, and the first subframe is a subframe that has a same subframe number as the first flexible subframe. In this way, the base station can determine, according to the uplink-downlink subframe configuration actually required by each user group, a direction of each flexible subframe actually required by each user group, so that user equipment in the user group, when receiving the configuration indication information, can adjust the direction of each flexible subframe to the direction actually required by the user group.

With reference to the first aspect or the first possible implementation of the first aspect, in a second possible implementation of the first aspect, before the classifying user equipments UEs in a first cell into N user groups, the method includes: obtaining, by the base station, a ratio of uplink traffic to downlink traffic of each user equipment in the first cell; and classifying, by the base station, the user equipments in the first cell into the N user groups according to the ratio of uplink traffic to downlink traffic of each user equipment in the first cell. In this way, user equipments having a same ratio of uplink traffic to downlink traffic can be classified into a same user group, so that user equipments using a same uplink-downlink subframe configuration can be classified into a same user group.

With reference to the second possible implementation of the first aspect, in a third possible implementation of the first aspect, when a ratio of uplink traffic to downlink traffic of first user equipment is the same as that of second user equipment, the base station classifies the first user equipment and the second user equipment into a same user group, where the first user equipment and the second user equipment belong to the first cell; or when a ratio of uplink traffic to downlink traffic of third user equipment is different from that of fourth user equipment, the base station classifies the third user equipment and the fourth user equipment into different user groups, where the third user equipment and the fourth user equipment belong to the first cell. In this way, the user equipments can be classified into the N user groups quickly.

With reference to the first aspect or the first possible implementation of the first aspect, in a fourth possible implementation of the first aspect, before the classifying user equipments UEs in a first cell into N user groups, the method includes: allocating, by the base station, a radio network temporary identifier RNTI to each user equipment in the first cell; and classifying, by the base station, the user equipments in the first cell into the N user groups according to a value of the RNTI of each UE modulo N and a preset correspondence between an uplink-downlink subframe configuration and the value of the RNTI of the user equipment modulo N, where N is a quantity of uplink-downlink subframe configurations in the first cell. The user equipment can be classified into the corresponding user group by using the RNTI and the preset correspondence between the uplink-downlink subframe configuration and the value of the RNTI of the user equipment modulo N, so that the primary uplink-downlink subframe configuration information can be adjusted more precisely to the uplink-downlink subframe configuration required by each user equipment.

With reference to the fourth possible implementation of the first aspect, in a fifth possible implementation of the first aspect, when a value of an RNTI of fifth user equipment modulo N is the same as a value of an RNTI of sixth user equipment modulo N, the base station classifies the fifth user equipment and the sixth user equipment into a same user group, where the fifth user equipment and the sixth user equipment belong to the first cell; or when a value of an RNTI of seventh user equipment modulo N is different from a value of an RNTI of eighth user equipment modulo N, the base station classifies the seventh user equipment and the eighth user equipment into different user groups, where the seventh user equipment and the eighth user equipment belong to the first cell.

With reference to any one of the first aspect to the fifth possible implementation of the first aspect, in a sixth possible implementation of the first aspect, the determining, by the base station, a primary uplink-downlink subframe configuration of the first cell according to an uplink-downlink subframe configuration of each group in the N user groups includes: determining, by the base station, the primary uplink-downlink subframe configuration of the first cell from the uplink-downlink subframe configuration of each user group in the N user groups based on a quantity of downlink subframes and a quantity of uplink subframes in the uplink-downlink subframe configuration of each user group in the N user groups. After directions of a few flexible subframes in the primary uplink-downlink subframe configuration determined in this manner are adjusted, the primary uplink-downlink subframe configuration can be adjusted to the uplink-downlink subframe configuration required by each user group.

With reference to the sixth possible implementation of the first aspect, in a seventh possible implementation of the first aspect, the determining, by the base station, the primary uplink-downlink subframe configuration of the first cell from the uplink-downlink subframe configuration of each user group in the N user groups based on a quantity of downlink subframes and a quantity of uplink subframes in the uplink-downlink subframe configuration of each user group in the N user groups includes: if a total quantity of downlink subframes in uplink-downlink subframe configurations of the N user groups in the first cell is larger than a total quantity of uplink subframes in the uplink-downlink subframe configurations thereof, determining, by the base station, an uplink-downlink subframe configuration of a third user group in the N user groups as the primary uplink-downlink subframe configuration of the first cell, where a quantity of downlink subframes included in the uplink-downlink subframe configuration of the third user group is the largest; or if a total quantity of uplink subframes in uplink-downlink subframe configurations of the N user groups in the first cell is larger than a total quantity of uplink subframes in the uplink-downlink subframe configurations thereof, determining, by the base station, an uplink-downlink subframe configuration of a fourth user group in the N user groups as the primary uplink-downlink subframe configuration of the first cell, where a quantity of uplink subframes included in the uplink-downlink subframe configuration of the fourth user group is the largest.

With reference to any one of the first aspect to the seventh possible implementation of the first aspect, in an eighth possible implementation of the first aspect, the configuration indication information of each user group is sent to user equipment in the user group by using a third subframe in the primary uplink-downlink subframe configuration of the user group, where the third subframe is at least one downlink subframe before the flexible subframe. This can reduce a signal delay.

With reference to any one of the first aspect to the eighth possible implementation of the first aspect, in a ninth possible implementation of the first aspect, the flexible subframe is a subframe in the primary uplink-downlink subframe configuration other than a subframe carrying common information, and supports uplink reception and downlink transmission.

According to a second aspect, an embodiment of the present application provides a subframe configuration method, including: receiving, by user equipment UE, a primary uplink-downlink subframe configuration of a first cell and configuration indication information that are sent by a base station, where the primary uplink-downlink subframe configuration includes a flexible subframe, a transmission direction of the flexible subframe is variable, the configuration indication information is used to indicate a transmission direction of the flexible subframe in a user group to which the user equipment belongs, the first cell includes N user groups, and N is a positive integer greater than or equal to 2; and adjusting, by the user equipment according to the configuration indication information, the transmission direction of the flexible subframe in the primary uplink-downlink subframe configuration of the user group to which the user equipment belongs.

With reference to the second aspect, in a first possible implementation of the second aspect, the first cell includes a first user group; and configuration indication information of the first user group is specifically used to instruct user equipment in the first user group to keep the transmission direction of the flexible subframe; or configuration indication information of the first user group is specifically used to instruct user equipment in the first user group to invert the transmission direction of the flexible subframe.

With reference to the first possible implementation of the second aspect, in a second possible implementation of the second aspect, the user equipment belongs to the first user group, and the adjusting, by the user equipment according to the configuration indication information, the transmission direction of the flexible subframe in the primary uplink-downlink subframe configuration of the user group to which the user equipment belongs includes: keeping, by the user equipment, the transmission direction of the flexible subframe in the primary uplink-downlink subframe configuration; or inverting, by the user equipment, the transmission direction of the flexible subframe in the primary uplink-downlink subframe configuration.

According to a third aspect, an embodiment of the present application provides a subframe configuration apparatus, including: a grouping unit, configured to classify user equipments UEs in a first cell into N user groups, where user equipments UEs in a same user group of the N user groups have a same uplink-downlink subframe configuration, and N is a positive integer greater than or equal to 2; a first determining unit, configured to determine a primary uplink-downlink subframe configuration of the first cell according to an uplink-downlink subframe configuration of each user group in the N user groups, where the primary uplink-downlink subframe configuration includes a flexible subframe, and a transmission direction of the flexible subframe is variable; a second determining unit, configured to determine configuration indication information of each user group according to the primary uplink-downlink subframe configuration and the uplink-downlink subframe configuration of each user group in the N user groups, where the configuration indication information is used to indicate a transmission direction of the flexible subframe in each user group; and a sending unit, configured to send the primary uplink-downlink subframe configuration and the configuration indication information to each user group.

With reference to the third aspect, in a first possible implementation of the third aspect, the first cell includes a first user group; and configuration indication information of the first user group is specifically used to instruct user equipment in the first user group to keep the transmission direction of the flexible subframe; or configuration indication information of the first user group is specifically used to instruct user equipment in the first user group to invert the transmission direction of the flexible subframe.

With reference to the third aspect or the first possible implementation of the third aspect, in a second possible implementation of the third aspect, the apparatus includes: an obtaining unit, configured to obtain a ratio of uplink traffic to downlink traffic of each user equipment in the first cell; where the grouping unit is specifically configured to classify the user equipments in the first cell into the N user groups according to the ratio of uplink traffic to downlink traffic of each user equipment in the first cell.

With reference to the first possible implementation of the third aspect, in a second possible implementation of the third aspect, when a ratio of uplink traffic to downlink traffic of first user equipment is the same as that of second user equipment, the base station classifies the first user equipment and the second user equipment into a same user group, where the first user equipment and the second user equipment belong to the first cell; or when a ratio of uplink traffic to downlink traffic of third user equipment is different from that of fourth user equipment, the base station classifies the third user equipment and the fourth user equipment into different user groups, where the third user equipment and the fourth user equipment belong to the first cell.

With reference to the third aspect or the first possible implementation of the third aspect, in a third possible implementation of the third aspect, the apparatus includes: an allocation unit, configured to allocate a radio network temporary identifier RNTI to each user equipment in the first cell; where the grouping unit is specifically configured to classify the user equipments in the first cell into the N user groups according to a value of the RNTI of each UE modulo N and a preset correspondence between an uplink-downlink subframe configuration and the value of the RNTI of the user equipment modulo N.

With reference to the third possible implementation of the third aspect, in a fourth possible implementation of the third aspect, the grouping unit is specifically configured to: when a value of an RNTI of fifth user equipment modulo N is the same as a value of an RNTI of sixth user equipment modulo N, classify the fifth user equipment and the sixth user equipment into a same user group, where the fifth user equipment and the sixth user equipment belong to the first cell; or when a value of an RNTI of seventh user equipment modulo N is different from a value of an RNTI of eighth user equipment modulo N, classify the seventh user equipment and the eighth user equipment into different user groups, where the seventh user equipment and the eighth user equipment belong to the first cell.

With reference to any one of the third aspect to the fourth possible implementation of the third aspect, in a fifth possible implementation of the third aspect, the first determining unit includes: a determining module, configured to determine the primary uplink-downlink subframe configuration of the first cell from the uplink-downlink subframe configuration of each user group in the N user groups based on a quantity of downlink subframes and a quantity of uplink subframes in the uplink-downlink subframe configuration of each user group in the N user groups.

With reference to the fifth possible implementation of the third aspect, in a sixth possible implementation of the third aspect, the determining module includes: a judging submodule, configured to determine whether a total quantity of downlink subframes in uplink-downlink subframe configurations of the N user groups in the first cell is larger than a total quantity of uplink subframes in the uplink-downlink subframe configurations thereof; and a first determining submodule, configured to determine, when the judging submodule determines that the total quantity of downlink subframes in the uplink-downlink subframe configurations of the N user groups in the first cell is larger than the total quantity of uplink subframes in the uplink-downlink subframe configurations thereof, an uplink-downlink subframe configuration of a third user group in the N user groups as the primary uplink-downlink subframe configuration of the first cell, where a quantity of downlink subframes included in the uplink-downlink subframe configuration of the third user group is the largest; or a second determining submodule, configured to determine, when the judging submodule determines that the total quantity of uplink subframes in the uplink-downlink subframe configurations of the N user groups in the first cell is larger than the total quantity of uplink subframes in the uplink-downlink subframe configurations thereof, an uplink-downlink subframe configuration of a fourth user group in the N user groups as the primary uplink-downlink subframe configuration of the first cell, where a quantity of uplink subframes included in the uplink-downlink subframe configuration of the fourth user group is the largest.

With reference to any one of the third aspect to the sixth possible implementation of the third aspect, in a seventh possible implementation of the third aspect, the configuration indication information of each user group is sent to user equipment in the user group by using a third subframe in the primary uplink-downlink subframe configuration of the user group, where the third subframe is at least one downlink subframe before the flexible subframe.

With reference to the third aspect to the seventh possible implementation of the third aspect, in an eighth possible implementation of the first aspect, the flexible subframe is a subframe in the primary uplink-downlink subframe configuration other than a subframe carrying common information, and supports uplink reception and downlink transmission.

According to a fourth aspect, an embodiment of the present application provides a subframe configuration apparatus, including: a receiving unit, configured to receive a primary uplink-downlink subframe configuration of a first cell and configuration indication information that are sent by a base station, where the primary uplink-downlink subframe configuration includes a flexible subframe, a transmission direction of the flexible subframe is variable, the configuration indication information is used to indicate a transmission direction of the flexible subframe in a user group to which the user equipment belongs, the first cell includes N user groups, and N is a positive integer greater than or equal to 2; and an adjustment unit, configured to adjust the transmission direction of the flexible subframe in the primary uplink-downlink subframe configuration according to the configuration indication information.

With reference to the fourth aspect, in a first possible implementation of the fourth aspect, the first cell includes a first user group; and configuration indication information of the first user group is specifically used to instruct user equipment in the first user group to keep the transmission direction of the flexible subframe; or configuration indication information of the first user group is specifically used to instruct user equipment in the first user group to invert the transmission direction of the flexible subframe.

With reference to the first possible implementation of the fourth aspect, in a second possible implementation of the fourth aspect, the user equipment belongs to the first user group, and the user equipment keeps the transmission direction of the flexible subframe in the primary uplink-downlink subframe configuration; or the user equipment inverts the transmission direction of the flexible subframe in the primary uplink-downlink subframe configuration.

According to a fifth aspect, an embodiment of the present application provides a base station, including a processor, a memory, a system bus, and a communications interface, where the memory is configured to store a computer-executable instruction, the processor and the memory are connected by the system bus, and when the base station runs, the processor executes the computer-executable instruction stored in the memory, so that the base station performs the subframe configuration method according to the first aspect or any optional implementation of the first aspect.

According to a sixth aspect, an embodiment of the present application provides a readable medium, including a computer-executable instruction, where when a processor of a base station executes the computer-executable instruction, the base station performs the subframe configuration method according to the first aspect or any optional implementation of the first aspect.

According to a seventh aspect, an embodiment of the present application provides user equipment, including a processor, a memory, a system bus, and a communications interface, where the memory is configured to store a computer-executable instruction, the processor and the memory are connected by the system bus, and when the user equipment runs, the processor executes the computer-executable instruction stored in the memory, so that the user equipment performs the subframe configuration method according to the second aspect or any optional implementation of the second aspect.

According to an eighth aspect, an embodiment of the present application provides a readable medium, including a computer-executable instruction, where when a processor of user equipment executes the computer-executable instruction, the user equipment performs the subframe configuration method according to the second aspect or any optional implementation of the second aspect.

According to a ninth aspect, an embodiment of the present application provides a communications system, where the communications system includes a plurality of user equipments and a base station, where the plurality of user equipments may be the user equipments according to the fourth aspect or any optional implementation of the fourth aspect, and the base station may be the base station according to the third aspect or any optional implementation of the third aspect; or the plurality of user equipments may be the user equipments according to the seventh aspect, and the base station may be the base station according to the fifth aspect.

Optionally, the user equipment may further include the readable medium according to the eighth aspect, and the base station may further include the readable medium according to the sixth aspect.

According to the user equipment, the base station, and the communications system provided by the embodiments of the present application for configuring a subframe, the base station classifies the user equipments in the first cell into the N user groups; and because the user equipments in the same user group use the same uplink-downlink subframe configuration, the base station can configure the corresponding configuration indication information for each user group according to the uplink-downlink subframe configuration of each user group and primary uplink subframe configuration information. In this way, when the base station sends the primary uplink-downlink subframe configuration to each user group in the N user groups, the user equipments in the same user group can make, only by adjusting a direction of each flexible subframe in at least one flexible subframe in the primary uplink-downlink subframe configuration of the first cell by using the configuration indication information of the user group to which the user equipments belong, the adjusted primary uplink-downlink subframe configuration of the first cell consistent with the uplink-downlink subframe configuration required by the user equipments. In this way, the base station can communicate with each user equipment in the first cell according to the uplink-downlink subframe configuration required by the user equipment.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application.

Full duplex wireless communications technology may be used to implement co-frequency co-time communication. To improve spectrum efficiency, an eNB (evolved NodeB) may use a full duplex mode to perform communication. When sending downlink information on a carrier frequency f1 to UE (user equipment) 1, the eNB receives, on the same carrier frequency f1, an uplink signal sent by UE 3 (herein the UE may use a half duplex mode shown in FIG. 1a or the full duplex mode shown in FIG. 1b to communicate with the eNB).

Figure 1A:
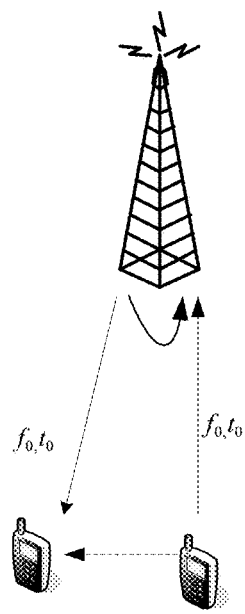
FIG. 1a is a schematic diagram 1 of a scenario of a subframe configuration method according to an embodiment of the present application.
Figure 1B:
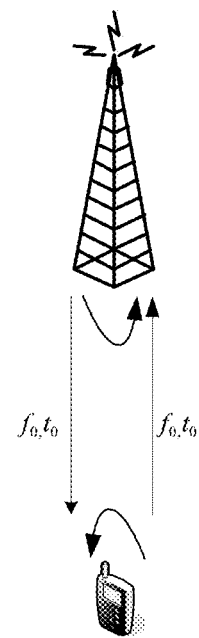
FIG. 1b is a schematic diagram 2 of a scenario of a subframe configuration method according to an embodiment of the present application.
Figure 1C:
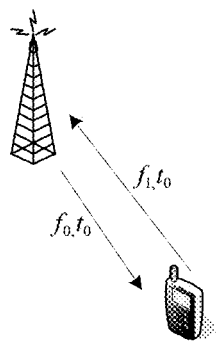
FIG. 1c is a schematic diagram of an FDD scenario.
Figure 1D:
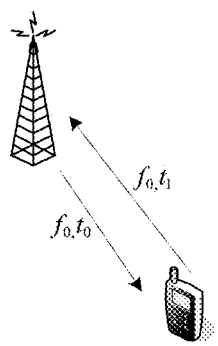
FIG. 1d is a schematic diagram of a TDD scenario.

The eNB may use FDD (frequency division duplex) shown in FIG. 1c or TDD (time division duplex) shown in FIG. 1d to communicate with the user equipment. The FDD shown in FIG. 1c needs to use paired frequencies, and an uplink and a downlink are distinguished depending on different frequencies. In a single direction in FDD, resources are continuous in time. An FDD mode is applicable to symmetric services, but most services in a commercial network are asymmetric services. For example, downlink traffic is heavier than uplink traffic, and in this case, numerous uplink spectrum resources are wasted (for example, a downlink bandwidth is 20 MHz, and an uplink 20 MHz bandwidth also needs to be allocated). As shown in FIG. 1d, TDD separates a receiving channel from a transmission channel by time, and uses different timeslots on a same frequency for reception and transmission. The uplink and the downlink are discontinuous in time. Time resources are allocated in two directions, and a ratio of uplink timeslots to downlink timeslots can be configured dynamically, making it convenient to support asymmetric services. In addition, because transmission and reception are performed on a same frequency, a TDD system can perform beamforming transmission by using uplink/downlink reciprocity, to improve downlink performance.

However, in scenarios shown in FIG. 1a and FIG. 1b, the base station sends a primary synchronization signal (PSS) and a secondary synchronization signal (SSS) to the user equipment by using broadcast signaling (for example, a MIB (master information block) message, a SIB (system information block) message, and RRC (radio resource control) signaling), so that the user equipment determines an initial full duplex mode (the initial full duplex mode is the FDD mode or a TDD mode) according to the PSS and SSS. Then the user equipment obtains, according to the PSS and the SSS, a PCI (physical cell identifier) of a cell in which the UE is located, and obtains, by using the PCI, the MIB and the SIB sent by the base station to the cell. The MIB and the SIB carry a PCC (primary component carrier) full duplex mode configured by the base station for the UE, and the PCC full duplex mode includes either of the full duplex mode and the half duplex mode. Alternatively, the UE obtains, by using the RRC signaling, a PCC full duplex mode configured by the base station for the UE, where the PCC full duplex mode includes one of the FDD mode, the TDD mode, the full duplex mode, and the half duplex mode. Finally, the UE communicates with the base station according to the obtained full duplex mode. However, delays of the signaling described above are all longer than 10 ms. For example, a delay of the MIB signaling is 40 ms, and a delay of the SIB signaling is 80 ms. Generally, the MIB signaling or the SIB signaling carries a cell-level parameter. If a user-level parameter is carried, signaling load is directly related to a quantity of users. In this case, overheads are high, delays are long, and therefore, it is impossible to adapt to a large connection and respond to an MBB (mobile broadband) transient service requirement in time.

For example, in an LTE TDD system, one of seven uplink-downlink subframe configurations shown in Table 1 may be used to configure a frame structure of a cell in the LTE TDD system.

TABLE 1

| Uplink-downlink configuration number | Period | Subframe number | | | | | | | | | |
|---|---|---|---|---|---|---|---|---|---|---|---|
| | | #0 | #1 | #2 | #3 | #4 | #5 | #6 | #7 | #8 | #9 |
| Configuration 0 | 5 ms | D | S | U | U | U | D | S | U | U | U |
| Configuration 1 | 5 ms | D | S | U | U | D | D | S | U | U | D |
| Configuration 2 | 5 ms | D | S | U | D | D | D | S | U | D | D |
| Configuration 3 | 10 ms | D | S | U | U | U | D | D | D | D | D |
| Configuration 4 | 10 ms | D | S | U | U | D | D | D | D | D | D |
| Configuration 5 | 10 ms | D | S | U | D | D | D | D | D | D | D |
| Configuration 6 | 5 ms | D | S | U | U | U | D | S | U | U | D |

A symbol D indicates that the subframe is used for a downlink transmission, a symbol U indicates that the subframe is used for an uplink transmission, and S indicates that the subframe is a special subframe. For the seven uplink-downlink subframe configuration modes shown in Table 1, when only uplink and downlink subframes are considered, according to a numbering sequence of the uplink-downlink subframe configuration modes in Table 1, ratios of subframes used for uplink transmission to subframes used for downlink transmission are 6/2, 4/4, 2/6, 3/6, 2/7, 1/8, and 5/3 respectively.

However, in an actual operation process of a network, a ratio of uplink traffic to downlink traffic in a cell always changes as network quality, a service type, or the like changes, and use of a fixed uplink-downlink subframe configuration by the user equipment during system running obviously cannot satisfy a requirement of the foregoing change.

Figure 2:
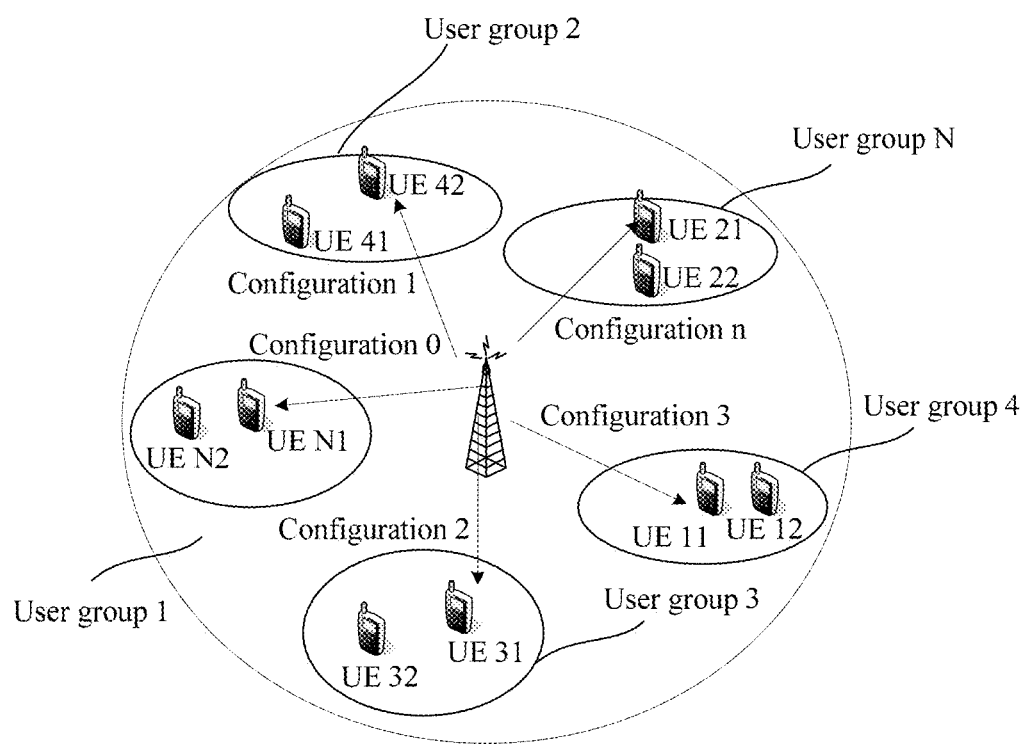
FIG. 2 is a schematic diagram of classifying user equipments in a first cell into N user groups according to an embodiment of the present application.

In order that the base station in the scenarios shown in FIG. 1a and FIG. 1b can not only receive, in a subframe, information sent by one user equipment, but also send information to another user equipment, that is, each user equipment can communicate with the base station according to an uplink-downlink subframe configuration actually required, in the embodiments of the present application, user equipments are classified into N user groups as shown in FIG. 2, where user equipments in a same user group use a same uplink-downlink subframe configuration; and then the base station determines a primary uplink-downlink subframe configuration of the first cell according to uplink-downlink subframe configurations of all user groups in the first cell, and determines configuration indication information of each user group according to the primary uplink-downlink subframe configuration, so that user equipments in each user group adjust, according to the configuration indication information, the primary uplink-downlink subframe configuration to an uplink-downlink subframe configuration actually required by the user equipments. In this way, the base station can use the full duplex mode in the first cell to communicate with each user equipment according to the uplink-downlink subframe configuration required by the user equipment.

To clearly describe the technical solutions of the embodiments of the present application, terms such as "first" and "second" are used in the embodiments of the present application to distinguish between same items or similar items that have basically the same functions or purposes. A person skilled in the art may understand that the terms such as "first" and "second" do not limit a quantity or an execution sequence.

The technical solutions provided by the embodiments of the present application may be applied to various wireless communications networks, for example, a Global System for Mobile Communications (GSM for short) system, a Code Division Multiple Access (CDMA for short) system, a Wideband Code Division Multiple Access (WCDMA for short) system, a Universal Mobile Telecommunications System (UMTS for short) system, a general packet radio service (GPRS for short) system, a Long Term Evolution (LTE for short) system, a Long Term Evolution Advanced (LTE-A for short) system, and a Worldwide Interoperability for Microwave Access (WiMAX for short) system. Terms "network" and "system" are interchangeable.

In the embodiments of the present application, a base station (BS for short) may be a device that communicates with UE (user equipment) or another communications station such as a relay station, and the base station may provide communications coverage in a specific physical area. For example, the base station may be specifically a base transceiver station (BTS for short) or a base station controller (BSC for short) in the GSM or CDMA, or may be a NodeB (NB for short) in the UMTS, or a radio network controller (RNC for short) in the UMTS, or may be an evolved NodeB (eNB or eNodeB for short) in the LTE, or may be another access network device providing an access service in a wireless communications network. This is not limited in the embodiments of the present application.

In the embodiments of the present application, UEs may be distributed in a whole wireless network, and each UE may be motionless or mobile.

The UE may be referred to as a terminal, a mobile station, a subscriber unit, a station, or the like. The UE may be a cellular phone, a personal digital assistant PDA for short), a wireless modem, a wireless communications device, a handheld device, a laptop computer, a cordless phone, a wireless local loop (WLL for short) station, or the like. When the UE is applied to M2M communication, the UE may be referred to as an M2M terminal, and may be specifically a smart meter or a smart appliance supporting M2M communication, or the like.

Figure 3A:
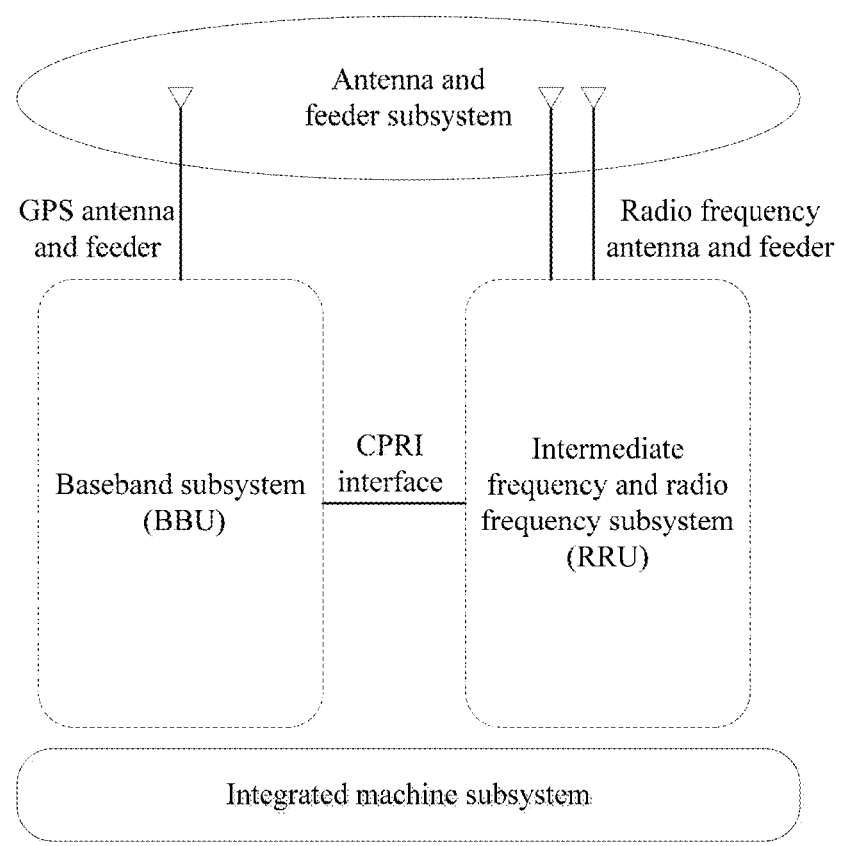
FIG. 3a is a schematic structural diagram of a base station in a subframe configuration method according to an embodiment of the present application.

A subframe configuration method and a subframe configuration apparatus provided by the embodiments of the present application may be performed by a base station eNB. As shown in FIG. 3a, a base station eNodeB includes a baseband subsystem, an intermediate frequency and radio frequency subsystem, an antenna and feeder subsystem, and some supporting structures (for example, an integrated machine subsystem). The baseband subsystem is configured to implement operation and maintenance of the whole base station, implement signaling processing, radio resource management, and a transmission interface to an EPC (packet core network), and implement functions of an LTE physical layer, a MAC (Medium Access Control) layer, L3 signaling, operation and maintenance, and main control; the intermediate frequency and radio frequency subsystem implements conversion between a baseband signal, an intermediate frequency signal, and a radio frequency signal, and implements demodulation of a received radio signal in LTE, modulation of a transmitted signal, and power amplification; the antenna and feeder subsystem includes an antenna and a feeder connected to a radio frequency module of the base station and an antenna and a feeder of a GRS receiving card, and is configured to implement radio signal reception and transmission on an air interface; and the integrated machine subsystem is a support part for the baseband subsystem and the intermediate frequency subsystem, and provides a structure, a power supply, and an environment monitoring function.

Figure 3B:
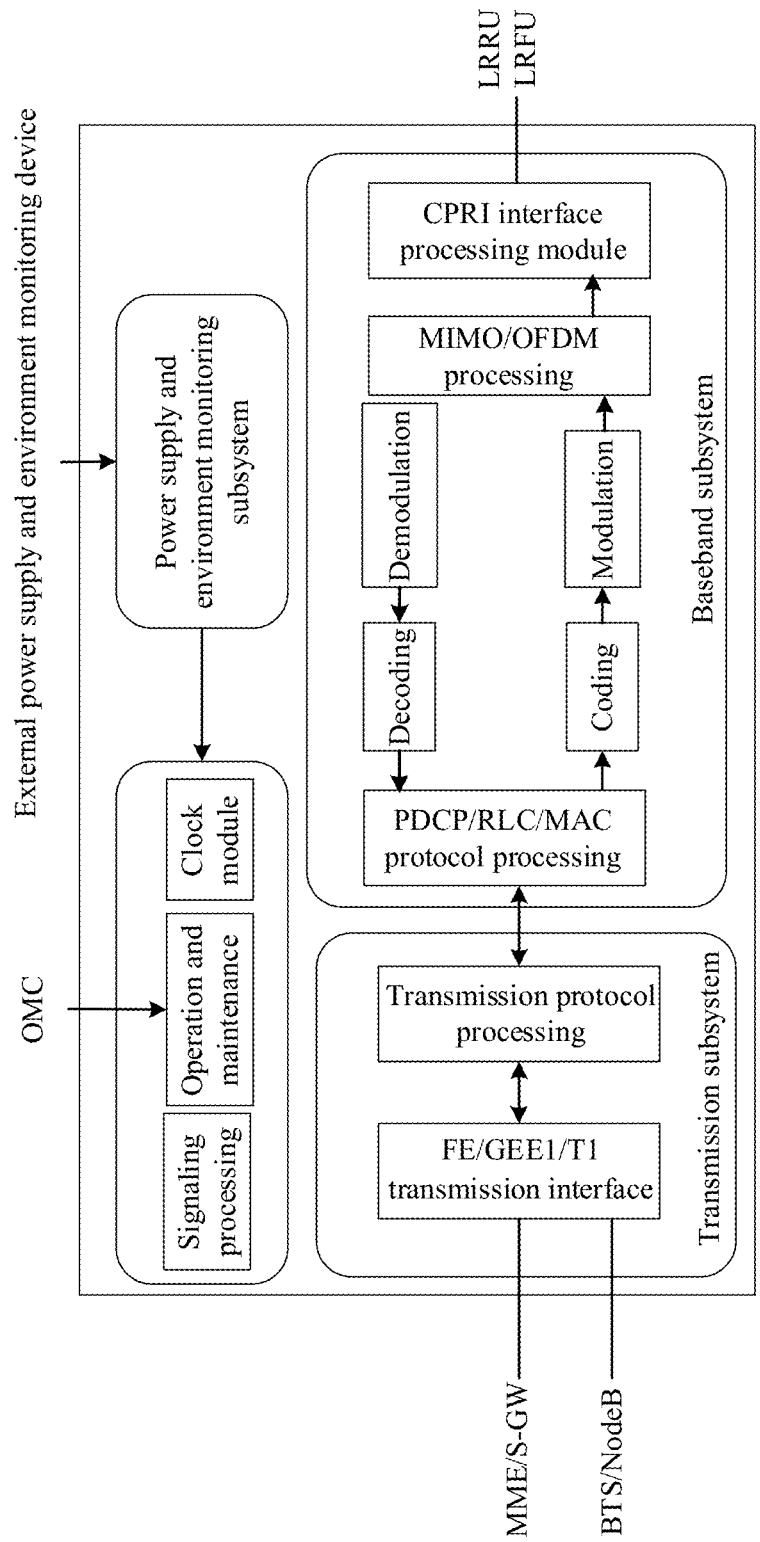
FIG. 3b is a schematic structural diagram of a baseband subsystem of a base station in a subframe configuration method according to an embodiment of the present application.

The baseband subsystem may be shown in FIG. 3b. For example, to access the Internet, a mobile phone needs to access a core network (MME/S-GW) through the base station and then access the Internet through the core network, where Internet data is transferred to a baseband part through an interface between the core network and the base station, the baseband part performs PDCP/RLC/MAC layer processing, coding, modulation, and the like, and sends the data to a radio frequency part, and the radio frequency part transmits the data to the terminal. The baseband may be connected to the radio frequency by using a CPRI interface. In addition, the radio frequency part may be placed remotely by using an optical fiber, for example, may be a remote RRU. Each step of the configuration method in the embodiments of the present application is implemented by the radio frequency under control of the baseband, and receiving and sending steps are implemented by using an antenna (for example, an air interface).

An interface between the user equipment and the base station in the embodiments of the present application may be understood as an air interface for communication between the user equipment and the base station, or may be referred to as a Uu interface.

Figure 4:
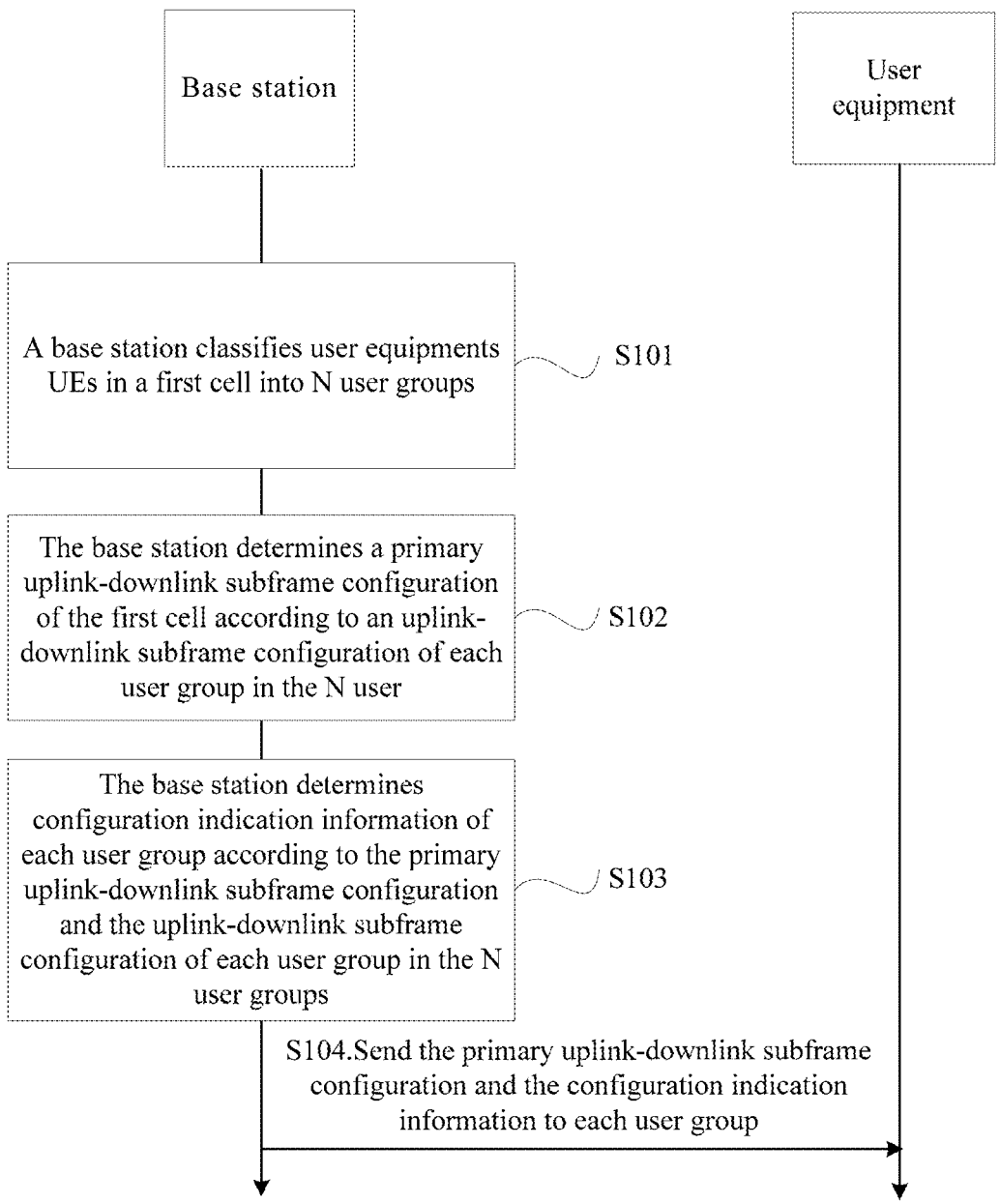
FIG. 4 is a schematic flowchart of a subframe configuration method according to an embodiment of the present application.

As shown in FIG. 4, an embodiment of the present application provides a subframe configuration method, including the following steps.

S101. A base station classifies user equipments UEs in a first cell into N user groups, where UEs in a same user group of the N user groups have a same uplink-downlink subframe configuration, and N is a positive integer greater than or equal to 2.

S102. The base station determines a primary uplink-downlink subframe configuration of the first cell according to an uplink-downlink subframe configuration of each user group in the N user groups, where the primary uplink-downlink subframe configuration includes a flexible subframe, and a transmission direction of the flexible subframe is variable.

S103. The base station determines configuration indication information of each user group according to the primary uplink-downlink subframe configuration and the uplink-downlink subframe configuration of each user group, where the configuration indication information is used to indicate a transmission direction of the flexible subframe in each user group.

S104. The base station sends the primary uplink-downlink subframe configuration and the configuration indication information to each user group.

In the subframe configuration method provided by this embodiment of the present application, the base station classifies the user equipments in the first cell into the N user groups; and because the user equipments in the same user group use the same uplink-downlink subframe configuration, the base station can configure the corresponding configuration indication information for each user group according to the uplink-downlink subframe configuration of each user group and primary uplink subframe configuration information. In this way, when the base station sends the primary uplink-downlink subframe configuration to each user group in the N user groups, the user equipments in the same user group can make, only by adjusting a direction of each flexible subframe in at least one flexible subframe in the primary uplink-downlink subframe configuration of the first cell by using the configuration indication information of the user group to which the user equipments belong, the adjusted primary uplink-downlink subframe configuration of the first cell consistent with the uplink-downlink subframe configuration required by the user equipments. In this way, the base station can communicate with each user equipment in the first cell according to the uplink-downlink subframe configuration required by the user equipment.

In this embodiment of the present application, that a transmission direction of the flexible subframe is variable means that an actual transmission direction of the flexible subframe may be determined according to a direction of a subframe that has a same number as the flexible subframe in each user group.

A manner of classifying the user equipments in the first cell into the N user groups by the base station in step S101 is not limited in this embodiment of the present application. The base station may classify the user equipments in the first cell into the N user groups according to a ratio of uplink traffic to downlink traffic of each user equipment or a radio network temporary identifier RNTI of each user equipment.

For example, to reduce interactions between the base station and another device, in this embodiment of the present application, before step S101, the user equipments may be classified into the N user groups according to the ratio of uplink traffic to downlink traffic of each user equipment.

For example, in order that the base station can obtain the N user groups in the first cell, before step S101, the method includes:

S1051A. The base station obtains a ratio of uplink traffic to downlink traffic of each user equipment in the first cell.

S1052A. The base station classifies the user equipments in the first cell into the N user groups according to the ratio of uplink traffic to downlink traffic of each user equipment in the first cell.

In this embodiment of the present application, the base station may obtain the proportion of uplink traffic of each user equipment in the first cell by collecting statistics of transport block sizes scheduled in an uplink and a downlink for each user equipment.

Manners and principles for classifying the user equipments into user groups in the first cell are the same. Therefore, in this embodiment of the present application, only first user equipment and second user equipment are used as an example for describing how to classify two user equipments into one user group, and third user equipment and fourth user equipment are used as an example for describing how to classify two user equipments into different user groups. The first user equipment and the second user equipment are respectively any user equipment in the first cell. The third user equipment and the fourth user equipment are respectively any user equipment in the first cell.

When a ratio of uplink traffic to downlink traffic of the first user equipment is the same as that of the second user equipment, the base station classifies the first user equipment and the second user equipment into a same user group; or when a ratio of uplink traffic to downlink traffic of the third user equipment is different from that of the fourth user equipment, the base station classifies the third user equipment and the fourth user equipment into different user groups.

In this embodiment of the present application, to determine that ratios of uplink traffic to downlink traffic of the user equipments are similar, a same uplink-downlink subframe configuration is required.

For example, in another aspect, the user equipments may be further classified into the N user groups by using radio network temporary identifiers RNTIs of the UEs in this embodiment of the present application.

For example, in S1051B, the base station allocates a radio network temporary identifier RNTI to each user equipment in the first cell; and in S1052B, the base station classifies the user equipments in the first cell into the N user groups according to a value of the RNTI of each UE modulo N and a preset correspondence between an uplink-downlink subframe configuration and the value of the RNTI of the user equipment modulo N. N is a quantity of pieces of uplink-downlink subframe configuration information in the first cell.

For example, if there are seven uplink-downlink subframe configurations in the first cell, a value of N is 7. The base station may determine the value of N based on the quantity of user groups of the user equipments in the first cell.

Specifically, when a value of an RNTI of fifth user equipment modulo N is the same as a value of an RNTI of sixth user equipment modulo N, the base station classifies the fifth user equipment and the sixth user equipment into a same user group, where the fifth user equipment and the sixth user equipment belong to the first cell; or when a value of an RNTI of seventh user equipment modulo N is different from a value of an RNTI of eighth user equipment modulo N, the base station classifies the seventh user equipment and the eighth user equipment into different user groups, where the seventh user equipment and the eighth user equipment belong to the first cell.

For example, if the value of the RNTI of the fifth user equipment modulo N is 0, and that of the sixth user equipment modulo N is also 0, and the value of the RNTI modulo N in a database pre-constructed by the base station, when being 0, corresponds to the configuration 0, or when being 1, corresponds to the configuration 1, and so on (certainly, there may also be another relationship between a value of an RNTI modulo N and a configuration, and this is not limited in this embodiment of the present application), the base station determines that the configuration 0 is used by the fifth user equipment and the sixth user equipment to which the RNTI is allocated, and classifies the fifth user equipment and the sixth user equipment into the same user group during grouping.

The manner of classifying the user equipments in the first cell into the N user groups is not limited in this embodiment of the present application, or grouping may be performed in another manner, as shown in FIG. 4, as long as it can be finally ensured that the user equipments in the same user group use the same uplink-downlink subframe configuration.

In this embodiment of the present application, a specific subframe number of a flexible subframe in the primary uplink-downlink subframe configuration is not limited, where the flexible subframe is a subframe other than a subframe carrying common information, and the base station needs to support both uplink reception and downlink transmission in the subframe. The subframe may be selected according to a requirement. Alternatively, after the primary uplink-downlink subframe configuration of the first cell is determined, a subframe number of each flexible subframe may be determined according to the uplink-downlink subframe configuration required by each user group. To be specific, if a subframe in the primary uplink-downlink subframe configuration is an uplink subframe in a user group, but the subframe is a downlink subframe in another user group, the subframe is a flexible subframe. A primary uplink-downlink subframe configuration includes at least one flexible subframe, where the flexible subframe is a downlink subframe in some user groups, and the flexible subframe is used to receive information sent by the base station; and the flexible subframe is an uplink subframe in some user groups, and the flexible subframe is used to send information to the base station.

For example, when uplink-downlink subframe configurations of a user group 1, a user group 2, and a user group 3 are the configuration 0: DSUUUDSUUU, the configuration 1: DSUUDDSUUD, and the configuration 2: DSUDDDSUDD respectively, if it is determined that the primary uplink-downlink subframe configuration of the first cell is the configuration 2, because a subframe #3 is a downlink subframe in the user group 3, the subframe #3 is an uplink subframe in the user group 2, the subframe #3 is also an uplink subframe in the user group 1, a subframe #4 is a downlink subframe in the user group 3, the subframe #4 is a downlink subframe in the user group 2, and the subframe #4 is an uplink subframe in the user group 1, the base station needs to send information in the subframe #3 to user equipments in the user group 3 and receive information sent by user equipments in the user group 2 and the user group 1 to the base station in the subframe #3; and the base station needs to receive, in the subframe #4, information sent by the user equipments, and also needs to send information in the subframe #4 to user equipments in the user group 2 and the user group 3. Therefore, the subframe #3 and the subframe #4 are flexible subframes. In addition, because a period of the configuration 2 is 5 ms, subframes #8 and #9 are also flexible subframes.

In this embodiment of the present application, a specific implementation of step S102 is not limited, and is merely an example. The base station may determine the primary uplink-downlink subframe configuration of the first cell in the following specific implementation.

S1021. The base station determines the primary uplink-downlink subframe configuration of the first cell from the uplink-downlink subframe configuration of each user group in the N user groups based on a quantity of downlink subframes and a quantity of uplink subframes in the uplink-downlink subframe configuration of each user group in the N user groups.

Figure 5:
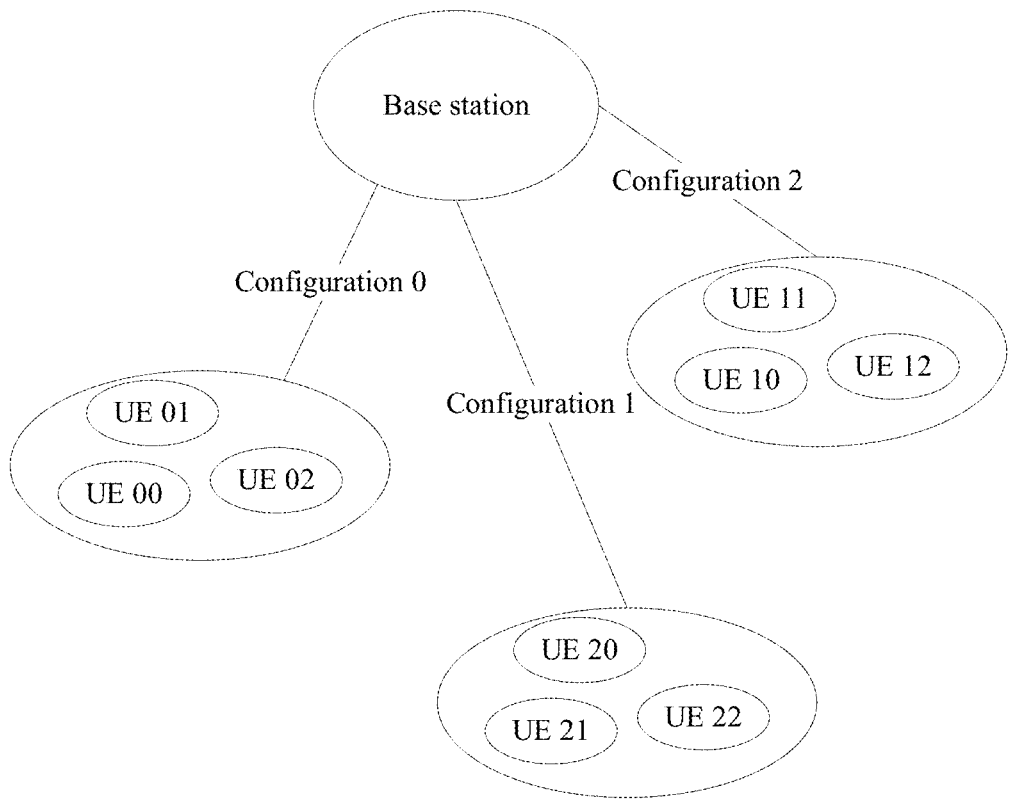
FIG. 5 is a schematic diagram 2 of classifying user equipments in a first cell into N user groups according to an embodiment of the present application.

For example, as shown in FIG. 5, FIG. 5 is a scenario in which the subframe configuration method provided by this embodiment of the present application is used to implement a user-level uplink-downlink subframe configuration in the first cell in an actual application. FIG. 5 is merely an example showing three user groups: the user group 1, the user group 2, and the user group 3. An uplink-downlink subframe configuration sent by the base station to user equipments UE 00, UE 01, and UE 02 in the user group 1 in the first cell is the configuration 0 shown in Table 1, an uplink-downlink subframe configuration sent by the base station to user equipments UE 10, UE 11, and UE 12 in the user group 2 in the first cell is the configuration 1 shown in Table 1, and an uplink-downlink subframe configuration sent by the base station to user equipments UE 20, UE 21, and UE 22 in the user group 3 in the first cell is the configuration 2 shown in Table 1. In this case, the uplink-downlink subframe configuration used by the user group 1 is DSUUUDSUUU, the uplink-downlink subframe configuration used by the user group 2 is DSUUDDSUUD, and the uplink-downlink subframe configuration used by the user group 3 is DSUDDDSUDD.

Because the primary uplink-downlink subframe configuration varies, content of the configuration indication information configured by the base station for each user group also varies. Because the configuration indication information of each user group is intended to adjust an direction of the flexible subframe in the primary uplink-downlink subframe configuration sent by the base station, the adjusted primary uplink-downlink subframe configuration is consistent with the uplink-downlink subframe configuration actually required by each user group. Therefore, in order that user equipments in most user groups can communicate with the base station according to the direction of the flexible subframe, that is, reduce adjustments made by the user equipments to the direction of the flexible subframe in the primary uplink-downlink configuration, step S1021 in this embodiment of the present application may be implemented by the following steps.

S10211. If the base station determines that a total quantity of downlink subframes in uplink-downlink subframe configurations of the N user groups in the first cell is larger than a total quantity of uplink subframes in the uplink-downlink subframe configurations thereof, the base station determines an uplink-downlink subframe configuration of a third user group in the N user groups as the primary uplink-downlink subframe configuration of the first cell, where a quantity of downlink subframes included in the uplink-downlink subframe configuration of the third user group is the largest.

For example, in the scenario shown in FIG. 5, if the three user groups in the first cell use the configuration 0, the configuration 1, and the configuration 2, the base station may determine that a quantity of downlink subframes in the first cell is the largest. In this case, an uplink-downlink subframe configuration in which a quantity of downlink subframes is the largest, that is, the configuration 2, should be selected from the configuration 0, the configuration 1, and the configuration 2 as the primary uplink-downlink subframe configuration of the first cell. When the first cell includes two user groups, where the user group 1 uses the configuration 5, and the user group 2 uses the configuration 0, the primary uplink-downlink subframe configuration of the first cell is the configuration 5.

S10212. If the base station determines that a total quantity of uplink subframes in uplink-downlink subframe configurations of the N user groups in the first cell is larger than a total quantity of uplink subframes in the uplink-downlink subframe configurations thereof, the base station determines an uplink-downlink subframe configuration of a fourth user group as the primary uplink-downlink subframe configuration of the first cell, where a quantity of uplink subframes included in the uplink-downlink subframe configuration of the fourth user group is the largest.

For example, in the scenario shown in FIG. 5, if the three user groups in the first cell use the configuration 0, the configuration 1, and the configuration 6, the base station may determine that a quantity of uplink subframes in the first cell is the largest. In this case, an uplink-downlink subframe configuration in which a quantity of uplink subframes is the largest, that is, the configuration 0, should be selected from the configuration 0, the configuration 1, and the configuration 6 as the primary uplink-downlink subframe configuration of the first cell.

Certainly, it should be noted that, any uplink-downlink subframe configuration may also be selected from the uplink-downlink subframe configurations of the N user groups as the primary uplink-downlink subframe configuration of the first cell. For example, the configuration 3 or the configuration 5 or the configuration 6 may be selected. This is not limited in this embodiment of the present application. When the primary uplink-downlink subframe configuration of the first cell is determined, only a corresponding uplink-downlink subframe configuration needs to be configured for the user group according to the primary uplink-downlink subframe configuration.

In this embodiment of the present application, a specific implementation in which the base station determines the configuration indication information of each user group in step S103 is not limited. Because manners and principles for determining, according to each flexible subframe in the primary uplink-downlink subframe configuration and the uplink-downlink subframe configuration required by each user group, the configuration indication information required by each user group are the same, in this embodiment of the present application, when the base station determines the configuration indication information of each user group, only a first flexible subframe and a first user group are used as an example for description, but this does not have any indicative meaning.

Configuration indication information of the first user group is specifically used to instruct user equipment in the first user group to keep the transmission direction of the flexible subframe, where a transmission direction of a first subframe in the first user group is the same as a transmission direction of the first flexible subframe included in the primary uplink-downlink subframe configuration, and the first subframe is a subframe that has a same subframe number as the first flexible subframe; or configuration indication information of the first user group is specifically used to instruct user equipment in the first user group to invert the transmission direction of the flexible subframe, where a transmission direction of a second subframe in the first user group is opposite to a transmission direction of the first flexible subframe included in the primary uplink-downlink subframe configuration, and the second subframe is a subframe that has a same subframe number as the first flexible subframe.

For example, the implementation may be as follows:

According to the subframe number and the direction of the first flexible subframe in the primary uplink-downlink subframe configuration information:

1. If the base station determines that the direction of the first flexible subframe is the same as the direction of the first subframe in uplink-downlink subframe configuration information of the first user group, the configuration indication information of the first user group is used to instruct the user equipment in the first user group to keep the direction of the first flexible subframe, where the first subframe is a subframe that has a same subframe number as the first flexible subframe.

In this embodiment of the present application, before the base station determines according to the subframe number and the direction of the first flexible subframe in the primary uplink-downlink subframe configuration information, the method further includes:

the base station determines each flexible subframe included in the primary uplink-downlink subframe configuration and the direction of the flexible subframe.

That the base station determines each flexible subframe included in the primary uplink-downlink subframe configuration and the direction of the flexible subframe may be: comparing the primary uplink-downlink subframe configuration with the uplink-downlink subframe configuration required by each user group; and for a subframe, if determining that a subframe that has a same subframe number as the subframe, in uplink-downlink configuration information required by user equipment in one user group is an uplink subframe, and that a subframe that has a same subframe number as the subframe, in uplink-downlink configuration information required by user equipment in another user group is a downlink subframe, the subframe is a flexible subframe. The subframe number of the flexible subframe may be sent to the user equipment by using the configuration indication information, or may be sent to the user equipment before the base station sends the configuration indication information to the user equipment.

For example, if the primary uplink-downlink subframe configuration of the first cell is the configuration 2: DSUDDDSUDD shown in Table 1, and the flexible subframe is the subframe #3, and the uplink-downlink subframe configuration required by the first user group is the configuration 2: DSUDDDSUDD shown in Table 1, because a direction of the subframe #3 in the uplink-downlink subframe configuration required by the third user group is consistent with a direction of the subframe #3 in the primary uplink-downlink subframe configuration of the first cell, the configuration indication information of the first user group is used to instruct to keep the direction of the subframe #3.

2. If the base station determines that the direction of the first flexible subframe is opposite to the direction of the second subframe in uplink-downlink configuration information of the first user group, the configuration indication information of the first user group is used to instruct the user equipment in the first user group to invert the direction of the first flexible subframe, where the second subframe is a subframe that has a same subframe number as the first flexible subframe.

When the configuration indication information of the first user group is used to instruct the user equipment in the first user group to invert the transmission direction of the first flexible subframe, the transmission direction of the second subframe in the first user group is opposite to the transmission direction of the first flexible subframe included in the primary uplink-downlink subframe configuration, where the second subframe is a subframe that has a same subframe number as the first flexible subframe.

For example, if the primary uplink-downlink subframe configuration of the first cell is the configuration 2: DSUDDDSUDD shown in Table 1, and the uplink-downlink subframe configuration required by the fourth user group is the configuration 1: DSUUDDSUUD shown in Table 1, because the subframe #3 is a downlink subframe in the primary uplink-downlink subframe configuration and is an uplink subframe in the configuration 1, to keep the primary uplink-downlink subframe configuration consistent with the uplink-downlink subframe configuration required by the fourth user group, that is, the subframe #3 in the primary uplink-downlink subframe configuration should be an uplink subframe in the fourth user group, the configuration indication information of the fourth user group should be used to instruct to change the subframe #3 (that is, a flexible subframe) in the primary uplink-downlink subframe configuration to an uplink subframe in the fourth user group. After receiving the configuration indication information of the fourth user group, user equipment in the fourth user group sends information in the subframe #3 to the base station.

Certainly, when the selected primary uplink-downlink subframe configuration varies, quantities of flexible subframes and subframe numbers in the primary uplink-downlink subframe configuration also varies. For example, when the primary uplink-downlink subframe configuration is the configuration 2, for user equipment requiring the configuration 1, the base station determines that flexible subframes in the primary uplink-downlink subframe configuration are the subframe #3 and a subframe #8 (because the period of the configuration 2 is 5 ms, the subframe #8 is also a flexible subframe); however, for user equipment requiring the configuration 0, the base station determines that flexible subframes in the primary uplink-downlink configuration information are the subframe #3 (the subframe #8 corresponding to the subframe #3) and the subframe #4 (a subframe #9 corresponding to the subframe #4).

It should be noted that, in this embodiment of the present application, the configuration indication information includes at least an identifier (for example, a subframe number) of the flexible subframe and a direction of the flexible subframe that needs to be applied in each user group.

In this embodiment of the present application, specific content of the configuration indication information of the first user group is not limited and a form thereof is also not limited. For example, when the transmission direction of the first subframe in the first user group is the same as the transmission direction of the first flexible subframe included in the primary uplink-downlink subframe configuration, the configuration indication information of the first user group includes first indication information.

When the direction of the first subframe in the first user group is opposite to the transmission direction of the first flexible subframe included in the primary uplink-downlink subframe configuration, the configuration indication information of the first user group includes second indication information.

In this embodiment of the present application, specific forms of the first indication information and the second indication information are not limited. The first indication information and the second indication information may be indicators. For example, the first indication information may be a first indicator, for example, "0", and the second indication information may be a second indicator, for example, "1". Sizes of the first indication information and the second indication information are 1 bit.

For example, when an indicator carried in the configuration indication information is 1, it indicates that an uplink subframe is changed to a downlink subframe, or a downlink subframe is changed to an uplink subframe. 0 indicates that when the flexible subframe is an uplink subframe, uplink transmission is performed based on the uplink subframe; or when the flexible subframe is a downlink subframe, information sent by the base station is received based on the downlink subframe.

In this embodiment of the present application, the base station may send the primary uplink-downlink subframe configuration to the user equipment by using an RRC (radio resource control) message, a MIB (master information block) message, or a SIB (system information block) message.

In this embodiment of the present application, the configuration indication information is carried in DCI (downlink control information) of at least one downlink subframe before the flexible subframe, as long as a field indicated by one bit, for example, Flexible Index, is appended to a DCI format 0 of a downlink subframe before the flexible subframe, where 0 indicates that the subframe is still indicated according to the primary configuration, that is, the subframe #3 is still a downlink subframe, and 1 indicates that the frame is changed to an uplink subframe or a downlink subframe.

For example, if the primary uplink-downlink subframe configuration is the configuration 2, and the flexible subframe is the subframe #3, and both a subframe #0 and a subframe #1 before the subframe #3 are downlink subframes, the configuration indication information of each user group may be sent to the user equipment by using the subframe #0 or the subframe #1.

When a subframe in the primary uplink-downlink subframe configuration is a non-inclusive subframe, the configuration indication information is carried in the at least one downlink subframe before the flexible subframe.

When a subframe in the primary uplink-downlink subframe configuration is an inclusive subframe, for the downlink, if downlink DCI is detected in a current subframe, the subframe is a downlink subframe for the UE, but scheduling of uplink DCI needs to be advanced by N subframes (N>0). Therefore, the configuration indication information should be carried in downlink control information in N subframes before an uplink subframe N.

It should be noted that, the flexible subframe should not be a subframe in which a common signal is transmitted. If a subframe N+N exactly corresponds to a subframe in which a common signal is transmitted, the flexible subframe is adjusted to a next subframe.

The configuration indication information of each user group is carried in a downlink control signal of a subframe N, and the configuration indication information is used to instruct the user equipment to perform uplink or downlink transmission in a first downlink or uplink subframe after the subframe N+N.

In order that the user equipment in each user group can adjust the direction of the flexible subframe in time, so that the user equipment in the user group can adjust, by adjusting the direction of the flexible subframe, the primary uplink-downlink subframe configuration to be consistent with the uplink-downlink subframe configuration required by the user group, in this embodiment of the present application, when sending, to each user group, the primary uplink-downlink subframe configuration and configuration indication information including at least the configuration indication information of the user group, the base station needs to send at least the configuration indication information of the user group to the user group. In other words, the base station may send, to user equipment in a user group only, only configuration indication information of the user group, or may send, to a user group, configuration indication information of the user group and configuration indication information of another user group.

Further, the configuration indication information carries an identifier of each user group, so that the user equipment obtains, in time according to the identifier of each user group, configuration indication information of a user group to which the user equipment belongs.

For example, when the base station sends the primary uplink-downlink subframe configuration and configuration indication information of the user group 1 to the user group 1, the base station may send only the primary uplink-downlink subframe configuration and the configuration indication information of the user group 1 to the user group 1, or may send the configuration indication information of each user group in the N user groups to the user group 1, that is, send configuration indication information respectively corresponding to the user group 1, the user group 2, and the user group 3 to the user group 1, or certainly, may send configuration indication information of some user groups, where the configuration indication information of some user groups should include the configuration indication information of the user group 1, that is, send configuration indication information of the user group 1 and the user group 2 to the user group 1, or send configuration indication information of the user group 1 and the user group 3 to the user group 1.

It should be noted that, if the configuration indication information sent by the base station includes configuration indication information of a user group other than the user group 1, when grouping the user equipments in the first cell, the base station needs to notify an identifier (number) of a user group to which each user equipment belongs. Certainly, the configuration indication information of each user group should also carry the identifier of the user group. In this way, when user equipment receives at least one piece of configuration indication information, the user equipment can obtain, from the at least one piece of configuration indication information according to an identifier of a user group to which the user equipment belongs, configuration indication information corresponding to the identifier of the user group to which the user equipment belongs.

It should be noted that, after receiving query indication information used for querying an identifier of a user group to which user equipment belongs and sent by the user equipment, the base station may send, to the user equipment, the identifier of the user group to which the user equipment belongs, or after classifying the user equipments into the N user groups, the base station may directly send, to each user equipment in the first cell, an identifier of a user group to which each user equipment belongs. This is not limited in this embodiment of the present application.

Figure 6:
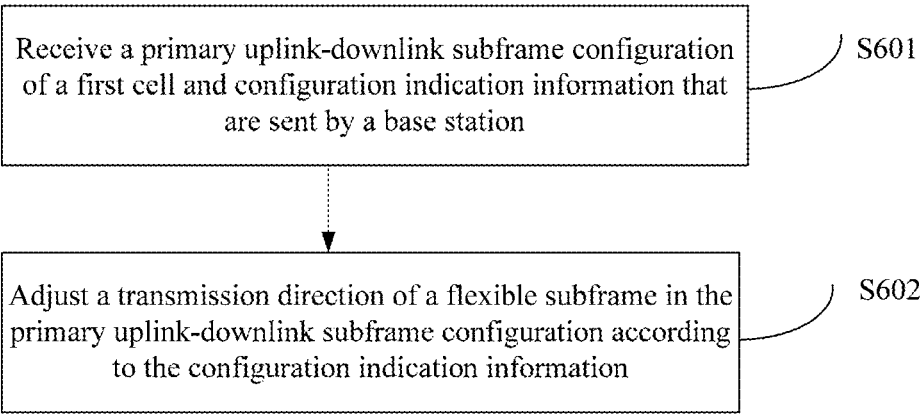
FIG. 6 is a schematic flowchart of another subframe configuration method according to an embodiment of the present application.

As shown in FIG. 6, an embodiment of the present application further provides a subframe configuration method, including the following steps.

S601. User equipment UE receives a primary uplink-downlink subframe configuration of a first cell and configuration indication information that are sent by a base station, where the primary uplink-downlink subframe configuration includes a flexible subframe, a transmission direction of the flexible subframe is variable, the configuration indication information is used to indicate a transmission direction of the flexible subframe in a user group to which the user equipment belongs, the first cell includes N user groups, and N is a positive integer greater than or equal to 2.

S602. The user equipment adjusts, according to the configuration indication information, the transmission direction of the flexible subframe in the primary uplink-downlink subframe configuration of the user group to which the user equipment belongs.

In the subframe configuration method provided by this embodiment of the present application, the user equipment receives the primary uplink-downlink subframe configuration of the first cell and the configuration indication information that are sent by the base station, and then adjusts the transmission direction of the flexible subframe in the primary uplink-downlink subframe configuration according to the configuration indication information, to adjust the transmission direction of the flexible subframe in the primary uplink-downlink subframe configuration to obtain an uplink-downlink subframe configuration required by the user equipment.

The first cell includes a first user group; and configuration indication information of the first user group is specifically used to instruct user equipment in the first user group to keep the transmission direction of the flexible subframe; or configuration indication information of the first user group is specifically used to instruct user equipment in the first user group to invert the transmission direction of the flexible subframe.

Optionally, when the transmission direction of the flexible subframe in the primary uplink-downlink subframe configuration is the same as a transmission direction of a first subframe in the uplink-downlink subframe configuration required by the user equipment, the configuration indication information includes first indication information, where the first subframe is a subframe that has a same subframe number as the flexible subframe; or when the transmission direction of the flexible subframe in the primary uplink-downlink subframe configuration is opposite to a transmission direction of a second subframe in the uplink-downlink subframe configuration required by the user equipment, the configuration indication information includes second indication information, where the second subframe is a subframe that has a same subframe number as the flexible subframe.

Optionally, step S602 may be specifically implemented by the following steps.

S6021. If the user equipment belongs to the first user group, the user equipment keeps the transmission direction of the flexible subframe in the primary uplink-downlink subframe configuration; or S6022. If the user equipment belongs to the first user group, the user equipment inverts the transmission direction of the flexible subframe in the primary uplink-downlink subframe configuration.

Further, the configuration indication information carries an identifier (for example, a number) of each user group, and the method further includes:

the user equipment determines, according to the identifier of the user group in the configuration indication information, configuration indication information of the user group to which the user equipment belongs.

It should be noted that, in this embodiment of the present application, the user equipment may send, to the base station, query indication information used for querying the identifier of the user group to which the user equipment belongs; and after receiving the query indication information, the base station sends, to the user equipment, the identifier of the user group to which the user equipment belongs; or after classifying user equipments into groups, the base station may directly send, to the user equipment, an identifier of a user group to which each user equipment belongs. This is not limited in this embodiment of the present application.

Figure 7:
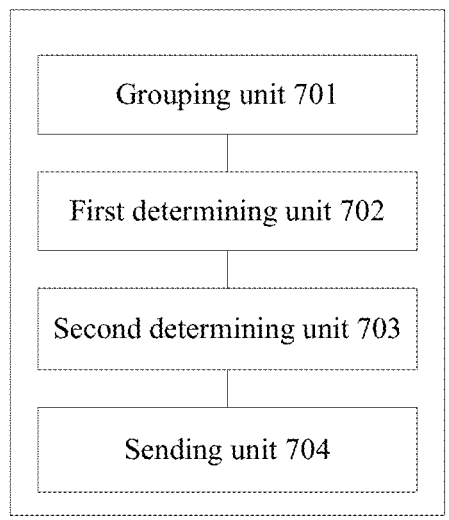
FIG. 7 is a schematic structural diagram 1 of a subframe configuration apparatus according to an embodiment of the present application.

As shown in FIG. 7, an embodiment of the present application provides a subframe configuration apparatus, including:

a grouping unit 701, configured to classify user equipments UEs in a first cell into N user groups, where user equipments UEs in a same user group of the N user groups have a same uplink-downlink subframe configuration, and N is a positive integer greater than or equal to 2;

a first determining unit 702, configured to determine a primary uplink-downlink subframe configuration of the first cell according to an uplink-downlink subframe configuration of each user group in the N user groups, where the primary uplink-downlink subframe configuration includes a flexible subframe, and a transmission direction of the flexible subframe is variable;

a second determining unit 703, configured to determine configuration indication information of each user group according to the primary uplink-downlink subframe configuration and the uplink-downlink subframe configuration of each user group in the N user groups, where the configuration indication information is used to indicate a transmission direction of the flexible subframe in each user group; and a sending unit 704, configured to send the primary uplink-downlink subframe configuration and the configuration indication information to each user group.

According to the subframe configuration apparatus provided by this embodiment of the present application, the base station classifies the user equipments in the first cell into the N user groups; and because the user equipments in the same user group use the same uplink-downlink subframe configuration, the base station can configure the corresponding configuration indication information for each user group according to the uplink-downlink subframe configuration of each user group and primary uplink subframe configuration information. In this way, when the base station sends the primary uplink-downlink subframe configuration to each user group in the N user groups, the user equipments in the same user group can make, only by adjusting a direction of each flexible subframe in at least one flexible subframe in the primary uplink-downlink subframe configuration of the first cell by using the configuration indication information of the user group to which the user equipments belong, the adjusted primary uplink-downlink subframe configuration of the first cell consistent with the uplink-downlink subframe configuration required by the user equipments. In this way, the base station can communicate with each user equipment in the first cell according to the uplink-downlink subframe configuration required by the user equipment.

Optionally, the first cell includes a first user group; and configuration indication information of the first user group is specifically used to instruct user equipment in the first user group to keep the transmission direction of the flexible subframe; or configuration indication information of the first user group is specifically used to instruct user equipment in the first user group to invert the transmission direction of the flexible subframe.

Optionally, when a transmission direction of a first subframe in the first user group is the same as the transmission direction of the first flexible subframe included in the primary uplink-downlink subframe configuration, the configuration indication information of the first user group includes first indication information; or when a direction of a first subframe in the first user group is opposite to the transmission direction of the first flexible subframe included in the primary uplink-downlink subframe configuration, the configuration indication information of the first user group includes second indication information.

The first indication information and the second indication information may be indicators, that is, the first indication information is a first indicator, and the second indication information is a second indicator.

Figure 8:
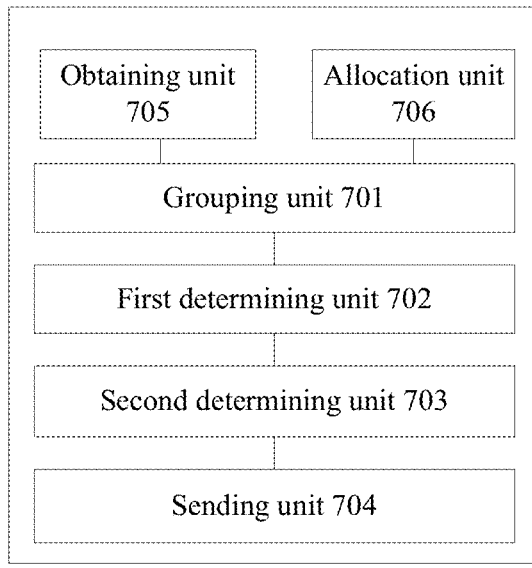
FIG. 8 is a schematic structural diagram 2 of a subframe configuration apparatus according to an embodiment of the present application.

Optionally, as shown in FIG. 8, the apparatus includes:

an obtaining unit 705, configured to obtain a ratio of uplink traffic to downlink traffic of each user equipment in the first cell; where the grouping unit 701 is specifically configured to classify the user equipments in the first cell into the N user groups according to the ratio of uplink traffic to downlink traffic of each user equipment in the first cell.

The grouping unit 701 is specifically configured to:

when a ratio of uplink traffic to downlink traffic of first user equipment is the same as that of second user equipment, classify the first user equipment and the second user equipment into a same user group, where the first user equipment and the second user equipment belong to the first cell; or when a ratio of uplink traffic to downlink traffic of third user equipment is different from that of fourth user equipment, classify the third user equipment and the fourth user equipment into different user groups, where the third user equipment and the fourth user equipment belong to the first cell.

Optionally, as shown in FIG. 8, the apparatus includes:

an allocation unit 706, configured to allocate a radio network temporary identifier RNTI to each user equipment in the first cell; where the grouping unit 701 is specifically configured to classify the user equipments in the first cell into the N user groups according to a value of the RNTI of each UE modulo N and a preset correspondence between an uplink-downlink subframe configuration and the value of the RNTI of the user equipment modulo N.

Optionally, the grouping unit 701 is specifically configured to:

when a value of an RNTI of fifth user equipment modulo N is the same as a value of an RNTI of sixth user equipment modulo N, classify the fifth user equipment and the sixth user equipment into a same user group, where the fifth user equipment and the sixth user equipment belong to the first cell; or when a value of an RNTI of seventh user equipment modulo N is different from a value of an RNTI of eighth user equipment modulo N, classify the seventh user equipment and the eighth user equipment into different user groups, where the seventh user equipment and the eighth user equipment belong to the first cell.

Optionally, the first determining unit 702 includes:

a determining module, configured to determine the primary uplink-downlink subframe configuration of the first cell from the uplink-downlink subframe configuration of each user group in the N user groups based on a quantity of downlink subframes and a quantity of uplink subframes in the uplink-downlink subframe configuration of each user group in the N user groups.

Optionally, the determining module includes:

a judging submodule, configured to determine whether a total quantity of downlink subframes in uplink-downlink subframe configurations of the N user groups in the first cell is larger than a total quantity of uplink subframes in the uplink-downlink subframe configurations thereof; and a first determining submodule, configured to determine, when the judging submodule determines that the total quantity of downlink subframes in the uplink-downlink subframe configurations of the N user groups in the first cell is larger than the total quantity of uplink subframes in the uplink-downlink subframe configurations thereof, an uplink-downlink subframe configuration of a third user group in the N user groups as the primary uplink-downlink subframe configuration of the first cell, where a quantity of downlink subframes included in the uplink-downlink subframe configuration of the third user group is the largest; or a second determining submodule, configured to determine, when the judging submodule determines that the total quantity of uplink subframes in the uplink-downlink subframe configurations of the N user groups in the first cell is larger than the total quantity of uplink subframes in the uplink-downlink subframe configurations thereof, an uplink-downlink subframe configuration of a fourth user group in the N user groups as the primary uplink-downlink subframe configuration of the first cell, where a quantity of uplink subframes included in the uplink-downlink subframe configuration of the fourth user group is the largest.

Optionally, the configuration indication information of each user group is sent to user equipment in the user group by using a third subframe in the primary uplink-downlink subframe configuration of the user group, where the third subframe is at least one downlink subframe before the flexible subframe.

Optionally, the flexible subframe is a subframe in the primary uplink-downlink subframe configuration other than a subframe carrying common information, and supports uplink reception and downlink transmission.

Figure 9:
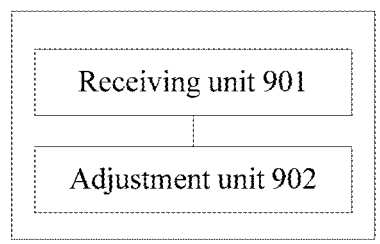
FIG. 9 is a schematic structural diagram of another subframe configuration apparatus according to an embodiment of the present application.

Optionally, as shown in FIG. 9, an embodiment of the present application provides a subframe configuration apparatus, where the apparatus includes:

a receiving unit 901, configured to receive a primary uplink-downlink subframe configuration of a first cell and configuration indication information that are sent by a base station, where the primary uplink-downlink subframe configuration includes a flexible subframe, a transmission direction of the flexible subframe is variable, the configuration indication information is used to indicate a transmission direction of the flexible subframe in a user group to which the user equipment belongs, the first cell includes N user groups, and N is a positive integer greater than or equal to 2; and an adjustment unit 902, configured to adjust, according to the configuration indication information, the transmission direction of the flexible subframe in the primary uplink-downlink subframe configuration of the user group to which the user equipment belongs.

The first cell includes a first user group; and configuration indication information of the first user group is specifically used to instruct user equipment in the first user group to keep the transmission direction of the flexible subframe; or configuration indication information of the first user group is specifically used to instruct user equipment in the first user group to invert the transmission direction of the flexible subframe.

Optionally, when the transmission direction of the flexible subframe in the primary uplink-downlink subframe configuration is the same as a transmission direction of a first subframe in an uplink-downlink subframe configuration required by the user equipment, the configuration indication information of the first user group includes first indication information, where the first subframe is a subframe that has a same subframe number as the flexible subframe; or when the transmission direction of the flexible subframe in the primary uplink-downlink subframe configuration is opposite to a transmission direction of a second subframe in an uplink-downlink subframe configuration required by the user equipment, the configuration indication information of the first user group includes second indication information, where the second subframe is a subframe that has a same subframe number as the flexible subframe.

Optionally, the adjustment unit 902 is specifically configured to:

if the user equipment belongs to the first user group, keep the transmission direction of the flexible subframe in the primary uplink-downlink subframe configuration; or if the user equipment belongs to the first user group, invert, by the user equipment, the transmission direction of the flexible subframe in the primary uplink-downlink subframe configuration.

Figure 10:
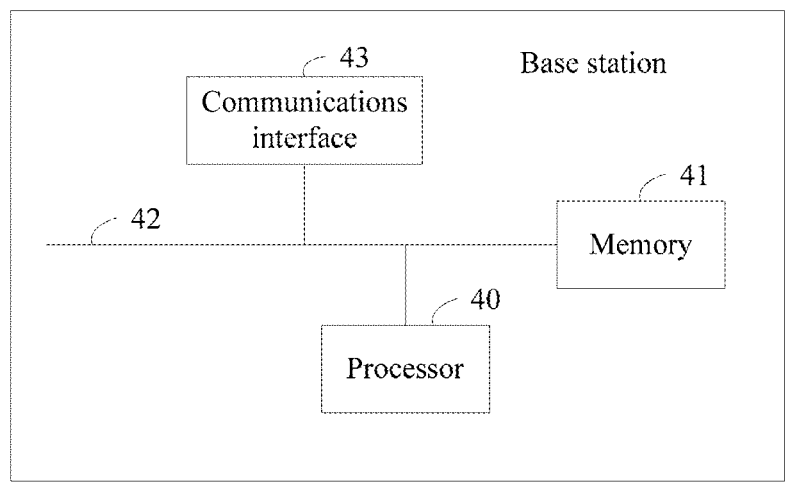
FIG. 10 is a schematic structural diagram of a base station according to an embodiment of the present application.

As shown in FIG. 10, an embodiment of the present application provides a base station, including a processor 40, a memory 41, a system bus 42, and a communications interface 43.

The memory 41 is configured to store a computer-executable instruction. The processor 40 and the memory 41 are connected by the system bus 42. When the base station runs, the processor 40 executes the computer-executable instruction stored in the memory 41, so that the base station performs the method performed by the base station in the subframe configuration method in FIG. 4. For the specific subframe configuration method, refer to the foregoing descriptions about the embodiment shown in FIG. 4. Details are not further described herein.

This embodiment of the present application provides a readable medium, including a computer-executable instruction, where when the processor of the base station executes the computer-executable instruction, the base station performs the method performed by the base station in the subframe configuration method shown in FIG. 4.

The processor 40 may be a CPU. The processor 40 may also be a general purpose processor, a DSP, an ASIC, an FPGA or another programmable logic device, a discrete gate or transistor logic device, a discrete hardware component, or the like. The general purpose processor may be a microprocessor, or the processor may be any conventional processor, or the like.

The processor 40 may be a dedicated processor, and the dedicated processor may include at least one of a baseband processing chip, a radio frequency processing chip, and the like. Further, the dedicated processor may include a chip having other dedicated processing functions of the base station.

The memory 41 may include a volatile memory, for example, a random access memory RAM. The memory 41 may also include a non-volatile memory, for example, a read-only memory ROM, a flash memory, an HDD, or an SSD. The memory 41 may further include a combination of the foregoing types of memories.

The system bus 42 may include a data bus, a power bus, a control bus, a signal status bus, and the like. In this embodiment, for clear description, various buses in FIG. 10 are all marked as the system bus 42.

The communications interface 43 may be specifically a transceiver on the base station. The transceiver may be a radio transceiver. For example, the radio transceiver may be an antenna of the base station. The processor 40 performs data reception and transmission with another device such as user equipment by using the communications interface 43.

In a specific implementation process, each step of the base station in the method procedure shown in FIG. 4 may be implemented by the processor 40 in a form of hardware by executing the computer-executable instruction stored in the memory 41 in a form of software. To avoid repetition, details are not further described herein.

Figure 11:
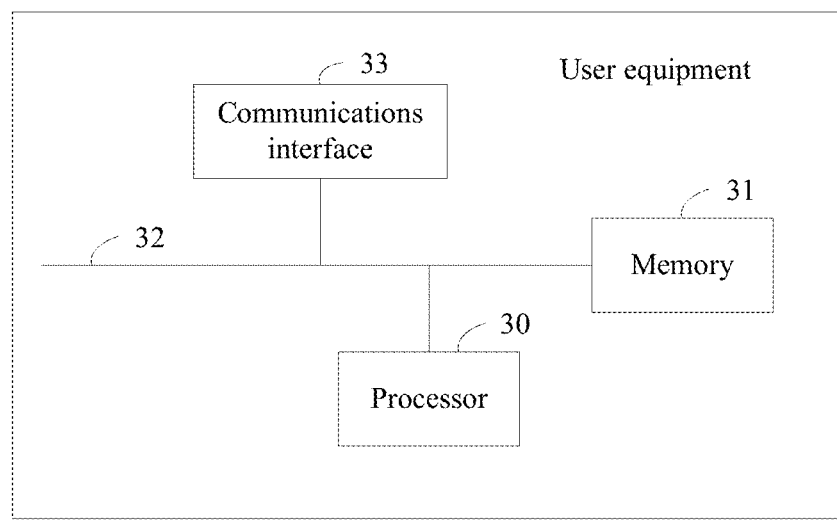
FIG. 11 is a schematic structural diagram of user equipment according to an embodiment of the present application.

As shown in FIG. 11, an embodiment of the present application provides user equipment, including a processor 30, a memory 31, a system bus 32, and a communications interface 33.

The memory 31 is configured to store a computer-executable instruction. The processor 30 and the memory 31 are connected by the system bus 32. When the user equipment runs, the processor 30 executes the computer-executable instruction stored in the memory 31, so that the user equipment performs the method performed by the user equipment in the subframe configuration method in FIG. 6. For the specific subframe configuration method, refer to the foregoing descriptions about the embodiment shown in FIG. 6. Details are not further described herein.

The processor 30 may be a central processing unit CPU for short). The processor 30 may also be a general purpose processor, a digital signal processor (DSP for short), an application-specific integrated circuit (ASIC for short), a field-programmable gate array (FPGA for short) or another programmable logic device, a discrete gate or transistor logic device, a discrete hardware component, or the like. The general purpose processor may be a microprocessor, or the processor may be any conventional processor, or the like.

The processor 30 may be a dedicated processor, and the dedicated processor may include at least one of a baseband processing chip, a radio frequency processing chip, and the like. Further, the dedicated processor may further include a chip having other dedicated processing functions of the user equipment.

The memory 31 may include a volatile memory, for example, a random access memory (RAM for short). The memory 31 may also include a non-volatile memory, for example, a read-only memory (ROM for short), a flash memory, a hard disk drive (HDD for short), or a solid-state drive (SSD for short). The memory 31 may further include a combination of the foregoing types of memories.

The system bus 32 may include a data bus, a power bus, a control bus, a signal status bus, and the like. In this embodiment, for clear description, various buses in FIG. 11 are all marked as the system bus 32.

The communications interface 33 may be specifically a transceiver on the user equipment. The transceiver may be a radio transceiver. For example, the radio transceiver may be an antenna of the user equipment. The processor 30 performs data reception and transmission with another device such as a base station by using the communications interface 33.

This embodiment of the present application provides user equipment. The user equipment receives a primary uplink-downlink subframe configuration of a first cell and configuration indication information that are sent by a base station, and then adjusts a transmission direction of the flexible subframe in the primary uplink-downlink subframe configuration according to the configuration indication information, to adjust the transmission direction of the flexible subframe in the primary uplink-downlink subframe configuration to obtain an uplink-downlink subframe configuration required by the user equipment.

In a specific implementation process, each step in the method procedure of the subframe configuration method in FIG. 6 may be implemented by the processor 30 in a form of hardware by executing the computer-executable instruction stored in the memory 31 in a form of software. To avoid repetition, details are not further described herein.

This embodiment further provides a storage medium, where the storage medium may include the memory 31.

An embodiment of the present application provides a readable medium, including a computer-executable instruction, where when a processor of user equipment executes the computer-executable instruction, the user equipment performs the subframe configuration method shown in FIG. 6.

An embodiment of the present application provides a communications system, where the communications system includes a plurality of user equipments and a base station. For detailed descriptions about each user equipment in the plurality of user equipments, refer to the foregoing descriptions about the user equipment in the embodiment shown in FIG. 9 or FIG. 11. For detailed descriptions about the base station, refer to the foregoing descriptions about the base station in the embodiment shown in FIG. 7 or FIG. 8 or FIG. 10. Details are not further described herein.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of a software function unit.

When the integrated unit is implemented in the form of a software functional unit and sold or used as an independent product, the integrated unit may be stored in a computer-readable storage medium. Based on such an understanding, all or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present application. The storage medium is a non-transitory medium, and includes any medium that can store program code, such as a flash memory, a removable hard disk, a read-only memory, a random access memory, a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A subframe configuration method, comprising:
    classifying, by a base station, user equipments (UEs) in a first cell into N user groups, wherein UEs in a same user group of the N user groups have a same uplink-downlink subframe configuration, and N is a positive integer greater than or equal to 2;
    determining, by the base station, a primary uplink-downlink subframe configuration of the first cell according to an uplink-downlink subframe configuration of each user group in the N user groups, wherein the primary uplink-downlink subframe configuration comprises a flexible subframe, and a transmission direction of the flexible subframe is variable;
    determining, by the base station, configuration indication information of each user group according to the primary uplink-downlink subframe configuration and the uplink-downlink subframe configuration of each user group, wherein the configuration indication information is used to indicate a transmission direction of the flexible subframe in each user group; and
    sending, by the base station, the primary uplink-downlink subframe configuration and the configuration indication information to each user group;
    wherein determining, by the base station, the primary uplink-downlink subframe configuration of the first cell according to the uplink-downlink subframe configuration of each user group in the N user groups further comprises:
    in the first cell, if a total quantity of downlink subframes in uplink-downlink subframe configurations of the N user groups is larger than a total quantity of uplink subframes in the uplink-downlink subframe configurations, determining, by the base station, an uplink-downlink subframe configuration of a third user group in the N user groups as the primary uplink-downlink subframe configuration of the first cell, wherein a quantity of downlink subframes comprised in the uplink-downlink subframe configuration of the third user group is the largest; or
    in the first cell, if a total quantity of uplink subframes in uplink-downlink subframe configurations of the N user groups is larger than a total quantity of uplink subframes in the uplink-downlink subframe configurations, determining, by the base station, an uplink-downlink subframe configuration of a fourth user group in the N user groups as the primary uplink-downlink subframe configuration of the first cell, wherein a quantity of uplink subframes comprised in the uplink-downlink subframe configuration of the fourth user group is the largest.

2. The method according to claim 1, wherein the first cell comprises a first user group; and
    configuration indication information of the first user group is specifically used to instruct user equipment in the first user group to keep the transmission direction of the flexible subframe; or
    configuration indication information of the first user group is specifically used to instruct user equipment in the first user group to invert the transmission direction of the flexible subframe.

3. The method according to claim 1, wherein before classifying the UEs in the first cell into the N user groups, the method comprises:
    obtaining, by the base station, a ratio of uplink traffic to downlink traffic of each user equipment in the first cell; and
    the classifying, by a base station, user equipments UEs in a first cell into N user groups comprises:
    classifying, by the base station, the user equipments in the first cell into the N user groups according to the ratio of uplink traffic to downlink traffic of each user equipment in the first cell.

4. The method according to claim 1, wherein before classifying the UEs in the first cell into the N user groups, the method comprises:

allocating, by the base station, a radio network temporary identifier (RNTI) to each user equipment in the first cell; and the classifying, by a base station, user equipments UEs in a first cell into N user groups comprises:

classifying, by the base station, the user equipments in the first cell into the N user groups according to a value of the RNTI of each UE modulo N and a preset correspondence between an uplink-downlink subframe configuration and the value of the RNTI of the user equipment modulo N.

5. The method according to claim 4, wherein classifying the user equipments in the first cell into the N user groups according to the value of the RNTI of each UE modulo N and the preset correspondence between the uplink-downlink subframe configuration and the value of the RNTI of the user equipment modulo N comprises:

when a value of an RNTI of fifth user equipment modulo N is the same as a value of an RNTI of sixth user equipment modulo N, classifying, by the base station, the fifth user equipment and the sixth user equipment into a same user group, wherein the fifth user equipment and the sixth user equipment belong to the first cell; or when a value of an RNTI of seventh user equipment modulo N is different from a value of an RNTI of eighth user equipment modulo N, classifying, by the base station, the seventh user equipment and the eighth user equipment into different user groups, wherein the seventh user equipment and the eighth user equipment belong to the first cell.

6. The method according to claim 1, wherein the flexible subframe is a subframe in the primary uplink-downlink subframe configuration other than a subframe carrying common information, the flexible subframe is configured to support uplink reception and downlink transmission.

7. The method according to claim 1, wherein the configuration indication information of each user group is sent to user equipment in the user group by using a third subframe in the primary uplink-downlink subframe configuration, wherein the third subframe is at least one downlink subframe before the flexible subframe.

8. A subframe configuration method, comprising:

determining, by a base station, a primary uplink-downlink subframe configuration of a first cell according to an uplink-downlink subframe configuration of each user group in N user groups in the first cell, wherein N is a positive integer greater than or equal to 2;

receiving, by user equipment (UE), the primary uplink-downlink subframe configuration of the first cell and configuration indication information that are sent by the base station, wherein the primary uplink-downlink subframe configuration comprises a flexible subframe, a transmission direction of the flexible subframe is variable, the configuration indication information is used to indicate a transmission direction of the flexible subframe in a user group to which the user equipment belongs; and adjusting, by the user equipment, the transmission direction of the flexible subframe in the primary uplink-downlink subframe configuration according to the configuration indication information;

wherein determining, by the base station, the primary uplink-downlink subframe configuration of the first cell according to the uplink-downlink subframe configuration of each user group in the N user groups in the first cell further comprises:

in the first cell, if a total quantity of downlink subframes in uplink-downlink subframe configurations of the N user groups is larger than a total quantity of uplink subframes in the uplink-downlink subframe configurations, determining, by the base station, an uplink-downlink subframe configuration of a third user group in the N user groups as the primary uplink-downlink subframe configuration of the first cell, wherein a quantity of downlink subframes comprised in the uplink-downlink subframe configuration of the third user group is the largest; or in the first cell, if a total quantity of uplink subframes in uplink-downlink subframe configurations of the N user groups is larger than a total quantity of uplink subframes in the uplink-downlink subframe configurations, determining, by the base station, an uplink-downlink subframe configuration of a fourth user group in the N user groups as the primary uplink-downlink subframe configuration of the first cell, wherein a quantity of uplink subframes comprised in the uplink-downlink subframe configuration of the fourth user group is the largest.

9. The method according to claim 8, wherein the first cell comprises a first user group; and configuration indication information of the first user group is specifically used to instruct user equipment in the first user group to keep the transmission direction of the flexible subframe; or configuration indication information of the first user group is specifically used to instruct user equipment in the first user group to invert the transmission direction of the flexible subframe.

10. The method according to claim 9, wherein the user equipment belongs to the first user group, and the adjusting, by the user equipment, the transmission direction of the flexible subframe in the primary uplink-downlink subframe configuration according to the configuration indication information comprises:

keeping, by the user equipment, the transmission direction of the flexible subframe in the primary uplink-downlink subframe configuration; or inverting, by the user equipment, the transmission direction of the flexible subframe in the primary uplink-downlink subframe configuration.

11. The method according to claim 8, wherein the flexible subframe is a subframe in the primary uplink-downlink subframe configuration other than a subframe carrying common information, the flexible subframe is configured to support uplink reception and downlink transmission.

12. A subframe configuration apparatus, comprising:

a memory storing instructions; and a processor coupled to the memory to execute the instructions to:

classify user equipments (UEs) in a first cell into N user groups, wherein user equipments UEs in a same user group of the N user groups have a same uplink-downlink subframe configuration, and N is a positive integer greater than or equal to 2;

determine a primary uplink-downlink subframe configuration of the first cell according to an uplink-downlink subframe configuration of each user group in the N user groups, wherein the primary uplink-downlink subframe configuration comprises a flexible subframe, and a transmission direction of the flexible subframe is variable;

determine configuration indication information of each user group according to the primary uplink-downlink subframe configuration and the uplink-downlink subframe configuration of each user group in the N user groups, wherein the configuration indication information is used to indicate a transmission direction of the flexible subframe in each user group; and send the primary uplink-downlink subframe configuration and the configuration indication information to each user group;

wherein determining the primary uplink-downlink subframe configuration of the first cell according to the uplink-downlink subframe configuration of each user group in the N user groups further comprises:

in the first cell, if a total quantity of downlink subframes in uplink-downlink subframe configurations of the N user groups is larger than a total quantity of uplink subframes in the uplink-downlink subframe configurations, determining, by the base station, an uplink-downlink subframe configuration of a third user group in the N user groups as the primary uplink-downlink subframe configuration of the first cell, wherein a quantity of downlink subframes comprised in the uplink-downlink subframe configuration of the third user group is the largest; or in the first cell, if a total quantity of uplink subframes in uplink-downlink subframe configurations of the N user groups is larger than a total quantity of uplink subframes in the uplink-downlink subframe configurations, determining, by the base station, an uplink-downlink subframe configuration of a fourth user group in the N user groups as the primary uplink-downlink subframe configuration of the first cell, wherein a quantity of uplink subframes comprised in the uplink-downlink subframe configuration of the fourth user group is the largest.

13. The apparatus according to claim 12, wherein the first cell comprises a first user group; and configuration indication information of the first user group is specifically used to instruct user equipment in the first user group to keep the transmission direction of the flexible subframe; or configuration indication information of the first user group is specifically used to instruct user equipment in the first user group to invert the transmission direction of the flexible subframe.

14. The apparatus according to claim 12, wherein the processor coupled to the memory to further execute the instructions to:

obtain a ratio of uplink traffic to downlink traffic of each user equipment in the first cell; wherein classify the UEs in the first cell into the N user groups comprises: classify the UEs in the first cell into the N user groups according to the ratio of uplink traffic to downlink traffic of each user equipment in the first cell.

15. The apparatus according to claim 12, wherein the processor coupled to the memory to further execute the instructions to:

allocate a radio network temporary identifier (RNTI) to each user equipment in the first cell; wherein classify the UEs in the first cell into the N user groups comprises: classify the user equipments in the first cell into the N user groups according to a value of the RNTI of each UE modulo N and a preset correspondence between an uplink-downlink subframe configuration and the value of the RNTI of the user equipment modulo N.

16. The apparatus according to claim 15, wherein the processor coupled to the memory to further execute the instructions to:

when a value of an RNTI of fifth user equipment modulo N is the same as a value of an RNTI of sixth user equipment modulo N, classify the fifth user equipment and the sixth user equipment into a same user group, wherein the fifth user equipment and the sixth user equipment belong to the first cell; or when a value of an RNTI of seventh user equipment modulo N is different from a value of an RNTI of eighth user equipment modulo N, classify the seventh user equipment and the eighth user equipment into different user groups, wherein the seventh user equipment and the eighth user equipment belong to the first cell.

17. The apparatus according to claim 12, wherein the flexible subframe is a subframe in the primary uplink-downlink subframe configuration other than a subframe carrying common information, the flexible subframe is configured to support uplink reception and downlink transmission.

18. The apparatus according to claim 12, wherein the configuration indication information of each user group is sent to user equipment in the user group by using a third subframe in the primary uplink-downlink subframe configuration, wherein the third subframe is at least one downlink subframe before the flexible subframe.

19. The apparatus according to claim 18, wherein adjust the transmission direction of the flexible subframe in the primary uplink-downlink subframe configuration according to the configuration indication information comprises:

keep the transmission direction of the flexible subframe in the primary uplink-downlink subframe configuration; or invert the transmission direction of the flexible subframe in the primary uplink-downlink subframe configuration.

20. A subframe configuration apparatus, comprising:

a memory storing instructions; and a processor coupled to the memory to execute the instructions to:

determine a primary uplink-downlink subframe configuration of a first cell according to an uplink-downlink subframe configuration of each user group in N user groups in the first cell, wherein N is a positive integer greater than or equal to 2;

receive the primary uplink-downlink subframe configuration of the first cell and configuration indication information that are sent by a base station, wherein the primary uplink-downlink subframe configuration comprises a flexible subframe, a transmission direction of the flexible subframe is variable, the configuration indication information is used to indicate a transmission direction of the flexible subframe in a user group to which the user equipment belongs; and adjust the transmission direction of the flexible subframe in the primary uplink-downlink subframe configuration according to the configuration indication information;

wherein determining the primary uplink-downlink subframe configuration of the first cell according to the uplink-downlink subframe configuration of each user group in the N user groups in the first cell further comprises:

in the first cell, if a total quantity of downlink subframes in uplink-downlink subframe configurations of the N user groups is larger than a total quantity of uplink subframes in the uplink-downlink subframe configurations, determining, by the base station, an uplink-downlink subframe configuration of a third user group in the N user groups as the primary uplink-downlink subframe configuration of the first cell, wherein a quantity of downlink subframes comprised in the uplink-downlink subframe configuration of the third user group is the largest; or in the first cell, if a total quantity of uplink subframes in uplink-downlink subframe configurations of the N user groups is larger than a total quantity of uplink subframes in the uplink-downlink subframe configurations, determining, by the base station, an uplink-downlink subframe configuration of a fourth user group in the N user groups as the primary uplink-downlink subframe configuration of the first cell, wherein a quantity of uplink subframes comprised in the uplink-downlink subframe configuration of the fourth user group is the largest.

21. The apparatus according to claim 20, wherein the first cell comprises a first user group; and configuration indication information of the first user group is specifically used to instruct user equipment in the first user group to keep the transmission direction of the flexible subframe; or configuration indication information of the first user group is specifically used to instruct user equipment in the first user group to invert the transmission direction of the flexible subframe.

22. The apparatus according to claim 20, wherein the flexible subframe is a subframe in the primary uplink-downlink subframe configuration other than a subframe carrying common information, the flexible subframe is configured to support uplink reception and downlink transmission.

* * * * *